United States Patent
Lee et al.

(10) Patent No.: US 12,137,348 B2
(45) Date of Patent: Nov. 5, 2024

(54) METHOD AND APPARATUS BY WHICH ELECTRONIC DEVICE PERFORMS SECURE RANGING

(71) Applicant: Samsung Electronics Co., Ltd., Gyeonggi-do (KR)

(72) Inventors: Mingyu Lee, Gyeonggi-do (KR); Sooyeon Jung, Gyeonggi-do (KR); Haeyoung Jun, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 113 days.

(21) Appl. No.: 18/015,847

(22) PCT Filed: Jul. 5, 2021

(86) PCT No.: PCT/KR2021/008494
§ 371 (c)(1),
(2) Date: Jan. 12, 2023

(87) PCT Pub. No.: WO2022/014924
PCT Pub. Date: Jan. 20, 2022

(65) Prior Publication Data
US 2023/0262467 A1    Aug. 17, 2023

(30) Foreign Application Priority Data
Jul. 14, 2020    (KR) ........................ 10-2020-0086974

(51) Int. Cl.
*H04W 12/50*    (2021.01)
*H04L 9/08*    (2006.01)
(Continued)

(52) U.S. Cl.
CPC ........... *H04W 12/50* (2021.01); *H04L 9/0819* (2013.01); *H04W 12/0431* (2021.01); *H04W 12/08* (2013.01)

(58) Field of Classification Search
CPC ...................................................... H04L 9/0819
(Continued)

(56) References Cited

U.S. PATENT DOCUMENTS

| 7,738,569 B2 | 6/2010 | Quinn et al. |
| 9,124,357 B2 | 9/2015 | Jia et al. |

(Continued)

FOREIGN PATENT DOCUMENTS

| KR | 10-2020-0005477 | 1/2020 |
| WO | WO 2019/067056 | 4/2019 |

OTHER PUBLICATIONS

PCT/ISA/210, International Search Report dated Sep. 17, 2021 issued in counterpart application No. PCT/KR2021/008494, 5 pages.
(Continued)

*Primary Examiner* — Samson B Lemma
(74) *Attorney, Agent, or Firm* — The Farrell Law Firm, P. C.

(57) ABSTRACT

Provided is a method, performed by an electronic device, of performing secure ranging with a target device. The method of performing secure ranging may include receiving a connection message for communication with the target device using a first communication method through a first communicator, transmitting, by a first applet in a secure element of the electronic device, a ranging session key for the target device to a second applet in the secure element, the ranging session key being stored in the first applet, receiving a ranging session request from the target device, based on the ranging session request, obtaining, by a second communicator, the ranging session key for the target device from the second applet, and by using the ranging session key, performing secure ranging using a second communication method with the target device through the second communicator.

13 Claims, 17 Drawing Sheets

(51) Int. Cl.
*H04W 12/0431* (2021.01)
*H04W 12/08* (2021.01)

(58) Field of Classification Search
USPC .......................................................... 713/170
See application file for complete search history.

(56) References Cited

U.S. PATENT DOCUMENTS

| | | | |
|---|---|---|---|
| 10,486,646 | B2 | 11/2019 | Ledvina et al. |
| 11,184,153 | B2 | 11/2021 | Hammerschmidt et al. |
| 11,736,937 | B2* | 8/2023 | Lemsitzer ............ H04W 12/037 |
| 2005/0125684 | A1* | 6/2005 | Schmidt ................ H04L 9/0836 |
| | | | 726/27 |
| 2008/0259896 | A1* | 10/2008 | Sahinoglu ........... G06K 7/10306 |
| | | | 370/345 |
| 2016/0234684 | A1* | 8/2016 | Hekstra ................... G06F 21/30 |
| 2019/0013937 | A1 | 1/2019 | Leong et al. |
| 2019/0168712 | A1* | 6/2019 | Yakovenko ............. B60R 25/24 |
| 2020/0106877 | A1* | 4/2020 | Ledvina .................... H04L 9/30 |
| 2020/0396078 | A1* | 12/2020 | Rule ......................... H04L 9/14 |
| 2021/0360395 | A1* | 11/2021 | Lemsitzer ............ H04W 12/037 |

OTHER PUBLICATIONS

PCT/ISA/237, Written Opinion dated Sep. 17, 2021 issued in counterpart application No. PCT/KR2021/008494, 3 pages.

* cited by examiner

FIG. 10

| Tag | Length | Description | Field is |
|---|---|---|---|
| 50<sub>h</sub> | 20 | key_identifier<br>: If optional field is not exist, the digital key applet sets all URSKs bonded to the given digital key_identifier to SUS Applet | mandatory |
| XX<sub>h</sub> | 4 | Specific UWB_Session_ID to be set to the SUS Applet<br>: When this field presents, the digital key applet set the URSK indexed with the given UWB_Session_ID to the SUS Applet | optional |

FIG. 11

| Tag | Length | Description | Field is |
|---|---|---|---|
| YY$_h$ | Var. | List of 4 bytes UWB_Session_Id which are set to SUS Applet | optional |

FIG. 12

| Tag | Length | Description | Field is |
|---|---|---|---|
| 50$_h$ | 20 | key_identifier<br>: If optional field is not exist, the digital key applet deletes all URSKs bonded to the given digital key_identifier | mandatory |
| XX$_h$ | 4 | Specific UWB_Session_Id to be deleted from digital key Applet<br>When this field presents, the digital key applet delets the URSK indexed with the give UWB_Session_Id | optional |

METHOD AND APPARATUS BY WHICH ELECTRONIC DEVICE PERFORMS SECURE RANGING

PRIORITY

This application is a National Phase Entry of PCT International Application No. PCT/KR2021/008494, which was filed on Jul. 5, 2021, and claims priority to Korean Patent Application No. 10-2020-0086974, which was filed on Jul. 14, 2020, the entire content of which is incorporated herein by reference.

TECHNICAL FIELD

The disclosure relates to an electronic device for performing secure ranging and an operating method of the electronic apparatus.

BACKGROUND ART

The Internet is evolving from a human-centered connection network through which humans create and consume information to an Internet of things (IoT) network through which distributed elements such as objects exchange and process information. Internet of everything (IoE) technology, which is a combination of IoT technology and big data processing technology through connection with a cloud server, has emerged. In order to implement the IoT, technology elements such as sensing technology, wired/wireless communication and network infrastructure, service interface technology, and security technology are required. Technology for inter-object connection, such as sensor network, machine-to-machine (M2M) communication, or machine-type communication (MTC), has recently been studied.

In the IoT environment, intelligent Internet technology (IT) services may be provided to collect and analyze data obtained from objects connected to each other to create new value in human life. The IoT may be applied to fields such as smart homes, smart buildings, smart cities, smart cars or connected cars, smart grids, health care, smart home appliances, and advanced medical services through convergence and integration of existing information technology (IT) and various industries.

With the development of wireless communication systems, it is possible to provide various services, and there is a need for a method to provide the services effectively. For example, in medium access control (MAC), ranging technology for measuring a distance between electronic devices by using ultra-wideband (UWB) may be used. UWB is radio communication technology that uses a very wide frequency band of several GHz or more in a base band without using a radio carrier wave.

With the supply of personalized electronic devices, such as smart phones and tablet personal computers (PCs), technologies for performing security, authentication, and the like using digital keys have been developed. As one of digital key technologies, a technology in which a digital key is integrated into a mobile device (e.g., a smartphone) using wireless communication technologies, such as near-field communication (NFC), UWB, wireless fidelity (WiFi), Bluetooth low energy (BLE), or Bluetooth, has been developed. That is, a digitized virtual key (i.e., a digital key) is inserted into a mobile device, and a user of the mobile device uses the digital key, such that the user may replace a physical key with a digital key for door opening or closing, control, access, etc.

As described above, the use of digital keys may bring great improvements in user convenience and industrial effects, but concerns regarding security have also been raised. That is, because a digital key basically needs to be combined with an electronic device, the digital key may be exposed to malicious use, such as hacking of the electronic device. Accordingly, a technology for safely storing and accessing a digital key in an electronic device is needed.

DISCLOSURE

Technical Problem

There is a need for a method of efficiently performing secure ranging by minimizing the time required to perform secure ranging.

Technical Solution

According to an embodiment of the disclosure, a method, performed by an electronic device, of performing secure ranging with a target device is provided. The method of performing secure ranging may include receiving a connection message for communication with the target device using a first communication method through a first communicator, transmitting, by a first applet in a secure element (SE) of the electronic device, a ranging session key for the target device to a second applet in the SE, the ranging session key being stored in the first applet, receiving a ranging session request from the target device, based on the ranging session request, obtaining, by a second communicator, the ranging session key for the target device from the second applet, and by using the ranging session key, performing secure ranging using a second communication method with the target device through the second communicator.

DESCRIPTION OF DRAWINGS

FIG. 10 is a diagram of a message for setting a ranging session key to a second applet, according to an embodiment of the disclosure.

FIG. 11 is a diagram of a message for reporting a ranging session key setting result, according to an embodiment of the disclosure.

FIG. 12 is a diagram of a message for deleting a ranging session key, according to an embodiment of the disclosure.

BEST MODE

Figure 1:
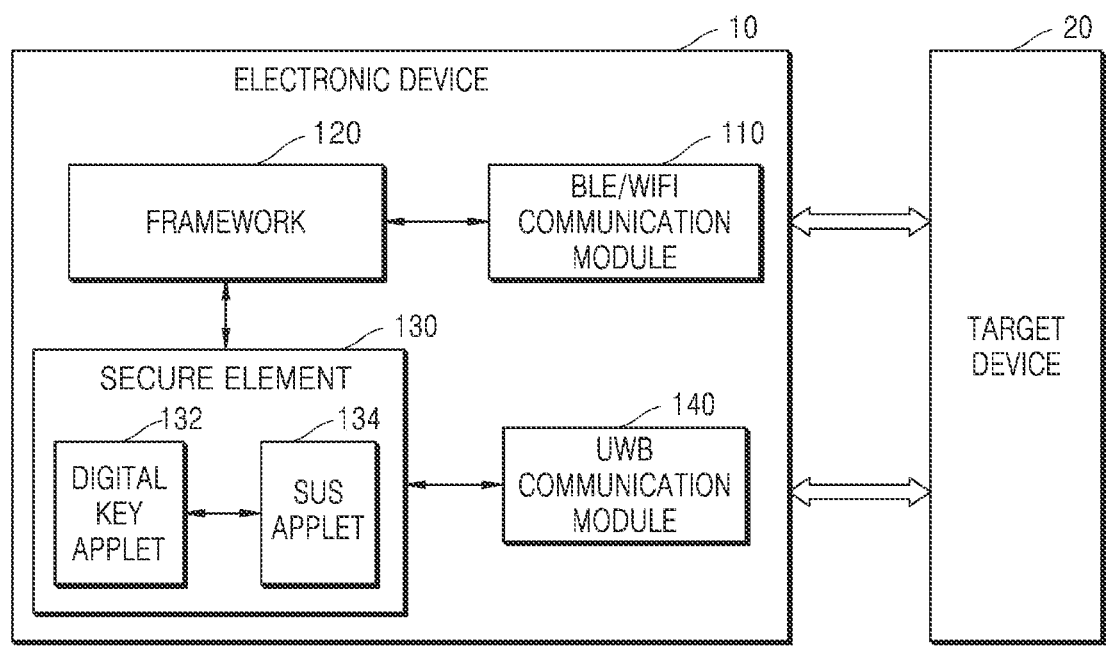
FIG. 1 illustrates a configuration of a system for performing secure ranging.

According to an embodiment of the disclosure, a method, performed by an electronic device, of performing secure ranging with a target device is provided. The method of performing secure ranging may include receiving a connection message for communication with the target device using a first communication method through a first communicator, transmitting, by a first applet in a secure element (SE) of the electronic device, a ranging session key for the target device to a second applet in the SE, the ranging session key being stored in the first applet, receiving a ranging session request from the target device, based on the ranging session request, obtaining, by a second communicator, the ranging session key for the target device from the second applet, and by using the ranging session key, performing secure ranging using a second communication method with the target device through the second communicator.

According to an embodiment of the disclosure, an electronic device may include a secure element (SE) in which a first applet and a second applet are stored, a communicator including a first communicator and a second communicator, and a processor connected to the SE and configured to execute program instructions stored in the memory. The processor may be configured to control the first communicator to receive a connection message for communication with a target device using a first communication method, transmit, by the first applet in the SE of the electronic device, a ranging session key for the target device to the second applet in the SE, the ranging session key being stored in the first applet, receive a ranging session request from the target device, based on the ranging session request, obtain, by the second communicator, the ranging session key for the target device from the second applet, and control the second communicator to perform, by using the ranging session key, secure ranging using a second communication method with the target device.

According to an embodiment of the disclosure, the first communication method may be a Bluetooth low energy (BLE) communication method, and the second communication method may be an ultra-wide band (UWB) communication method, and the connection message may include information in which identification information about the target device is encrypted.

According to an embodiment of the disclosure, the method may further include identifying the target device from the connection message, wherein the identifying of the target device from the connection message may include decrypting the connection message by using an encryption key pre-agreed with the target device, and based on the decrypted connection message, identifying the target device.

According to an embodiment of the disclosure, the method may further include identifying the target device based on the connection message, determining whether a valid ranging session key for the identified target device is available, and based on the determining that the valid ranging session key is available, transmitting, to the first applet, a ranging session key setting message indicating transmission of the ranging session key to the second applet.

According to an embodiment of the disclosure, the ranging session key setting message may include at least one of a session identifier or a digital key identifier for the target device, and the first applet may be configured to set, to the second applet, the ranging session key indexed based on the ranging session key setting message.

According to an embodiment of the disclosure, the transmitting of the ranging session key to the second applet by the first applet may further include transmitting, by the first applet, the ranging session key to the second applet based on the ranging session key setting message, and based on a result of the setting of the ranging session key to the second applet by the first applet, transmitting, by the first applet, a ranging session key setting response message to a framework. The ranging session key setting response message may include at least one of information about whether the ranging session key is successfully set, or a list of session identifiers stored in the second applet.

According to an embodiment of the disclosure, the obtaining of the ranging session key for the target device from the second applet by the second communicator based on the ranging session request may include based on the ranging session key setting response message, determining whether the ranging session key corresponding to the ranging session request is stored in the second applet, and based on the determining that the ranging session key is stored in the second applet, triggering the second communicator to obtain the ranging session key from the second applet.

According to an embodiment of the disclosure, the method may further include, when the second communicator has successfully obtained the ranging session key from the second applet, transmitting, to the first applet, a ranging session key deletion message requesting deletion of the ranging session key stored in the first applet, and deleting, by the first applet, the ranging session key indexed by the ranging session key deletion message, wherein the ranging session key deletion message may include at least one of a session identifier or a digital key identifier for the target device.

According to an embodiment of the disclosure, the method may further include, based on the ranging session key deletion message, deleting, by the first applet, the ranging session key, and based on a result of the deleting of the ranging session key, transmitting, by the first applet, a ranging session key deletion response message to a framework. The ranging session key deletion response message may include information about whether the ranging session key is successfully deleted.

MODE FOR INVENTION

Hereinafter, embodiments of the disclosure will be described in detail with reference to the accompanying drawings so that the embodiments of the disclosure may be easily implemented by one of ordinary skill in the art. However, the disclosure may be embodied in many different forms and is not limited to the embodiments set forth herein.

Also, for clarity, parts not related to explaining the disclosure are omitted in the drawings, and like components are denoted by like reference numerals throughout the specification.

Terms used herein are described as general terms currently used in consideration of functions described in the disclosure, but the terms may have different meanings according to an intention of one of ordinary skill in the art, precedent cases, or the appearance of new technologies. Thus, the terms used herein should not be interpreted only by their names, but have to be defined based on the meanings of the terms together with the description throughout the specification.

While such terms as "first", "second", etc., may be used to describe various components, such components must not be limited to the above terms. The above terms are used only to distinguish one component from another.

Also, the terms used herein are for the purpose of describing certain embodiments of the disclosure only and are not intended to limit the disclosure. The singular expressions are intended to include plural forms as well, unless the context clearly dictates otherwise. Also, throughout the specification, when a portion is referred to as being "connected" to another portion, it will be understood to include that the portion is "directly connected" to the other portion or is "electrically connected" to the other portion with another element therebetween. Also, it will be understood that when a portion is referred to as "including" a certain component, the portion may further include another component instead of excluding the other component, unless mentioned otherwise.

As used in the specification, "the" and similar referents may be used to indicate both singular and plural forms. Also, when there is no description explicitly specifying an order of operations of a method according to the disclosure, the operations may be performed in an appropriate order. The disclosure is not limited to the order of the operations described.

The expression "in an embodiment" and the like appearing in various parts of the specification are not intended to refer to the same embodiment.

An embodiment of the disclosure may be represented by functional block configurations and various operations. Some or all of the functional blocks may be implemented by various numbers of hardware and/or software configurations for performing certain functions. For example, the functional blocks of the disclosure may be implemented by one or more microprocessors or by circuit configurations for a certain function. Also, for example, the functional blocks of the disclosure may be implemented in various programming or scripting languages. The functional blocks may be implemented in an algorithm executed by one or more processors. In addition, the disclosure may employ general techniques for electronic environment setting, signal processing, and/or data processing.

Also, lines or members connecting components illustrated in the drawings are merely illustrative of functional connections and/or physical or circuit connections. In an actual apparatus, the connections between components may be represented by various functional connections, physical connections, or circuit connections that are replaceable or added.

In general, wireless sensor network technology is largely classified into wireless local area network (WLAN) and wireless personal area network (WPAN) according to a distance identified. In this case, WLAN is IEEE 802.11-based technology for connection to a backbone network within around a radius of 100 m. In addition, WPAN is IEEE 802.15-based technology, and examples of WPAN include Bluetooth, ZigBee, and ultra-wideband (UWB).

A wireless network in which such wireless network technology is implemented may be composed of a plurality of communication electronic devices. In this case, the plurality of communication electronic devices perform communication in an active period by using a single channel. That is, the plurality of communication electronic devices may collect and transmit packets in the active period.

UWB may refer to short-range high-speed radio communication technology using a wide frequency band of several GHz or more, a low spectral density, and a short pulse width (1 to 4 nsec) in a baseband state. UWB may refer to a band itself to which UWB communication is applied. A ranging method performed between electronic devices will now be described based on a UWB communication method, but the UWB communication method is merely an example and various radio communication technologies may be used in practice.

Electronic devices according to embodiments of the disclosure may include a fixed terminal embodied as a computer device or a mobile terminal and may communicate with other devices and/or servers by using a wireless or wired communication method. For example, the electronic devices may include smart phones, mobile terminals, laptop computers, digital broadcast terminals, personal digital assistants (PDAs), portable multimedia players (PMPs), navigation devices, slate PCs, tablet PCs, digital televisions (digital TVs), desktop computers, refrigerators, projectors, vehicles, smart cars, printers, etc., but are not limited thereto.

Various embodiments of the disclosure relate to technology regarding medium access control (MAC) based on device-to-device (D2D) communication.

D2D communication refers to a method in which geographically adjacent electronic devices communicate directly with each other without via an infrastructure, such as a base station. The electronic devices may communicate with each other in a 1:1, 1:many, or many:many manner. D2D communication may use an unlicensed frequency band, such as wireless fidelity (WiFi) direct (WFD) or Bluetooth. Alternatively, in D2D communication, licensed frequency bands may be used to improve frequency utilization efficiency of cellular systems. Although D2D communication is restrictively used to refer to machine-to-machine communication or machine intelligent communication, in the disclosure, D2D communication is intended to refer to not only communication between electronic devices having a communication function but also communication between various types of electronic devices having a communication function, such as smartphones or PCs.

Various embodiments of the disclosure relate to MAC based on the aforementioned D2D communication, and it is necessary to measure a distance between electronic devices for MAC. In this case, UWB ranging technology may be used to measure the distance between the electronic devices. For example, when a digital key (DK) stored in a smartphone is used to open or close a door of a vehicle, the vehicle may measure a distance between the smartphone and the vehicle by using a UWB communication module, and then estimate a location of the smartphone based on a result of the measurement. The vehicle and the smartphone may use multicast ranging or broadcast ranging.

Hereinafter, the disclosure will be described in detail with reference to the accompanying drawings.

FIG. 1 illustrates a configuration of a system for performing secure ranging.

Referring to FIG. 1, the system for performing secure ranging may include an electronic device 10 and a target device 20. The electronic device 10 may use secure ranging to measure a distance from the target device 20. For example, the electronic device 10 may perform UWB ranging with the target device 20.

According to an embodiment of the disclosure, the electronic device 10 may be implemented in various forms. For example, the electronic device 10 may include a smart TV, a set-top box, a mobile phone, a tablet PC, a digital camera, a laptop computer, a desktop computer, an electronic book reader, a digital broadcast terminal, a PDA, a PMP, a navigation device, an MP3 player, a wearable device, etc. However, the electronic device 10 is not limited to the aforementioned example, and the electronic device 10 may include any device capable of communicating with a server (not shown) through a network and communicating with the target device 20 through short-range wireless communication. For example, the electronic device 10 may include any device capable of performing secure ranging with the target device 20.

The target device 20 may be provided at a gate of a vehicle, a hotel, a house, a building, an amusement park, a ski resort, or the like and may control whether to open or close the gate. For example, the target device 20 may control whether to open or close a vehicle door, a trunk gate, a fuel filler port, or the like and may also control start-up and air conditioning in a vehicle. However, according to an embodiment of the disclosure, the target device 20 is not limited to the aforementioned examples and may include various types of electronic devices. The target device 20 may include any device capable of communicating with the server (not shown) through the network and communicating with the electronic device 10 through the short-range wireless communication.

The electronic device 10 may manage a DK to control the target device 20 or access the target device 20. The DK refers to a digitized virtual key, and the electronic device 10 may control the target device 20 or access the target device 20 by using the DK.

The target device 20 may perform short-range wireless communication with the electronic device 10. In detail, according to an embodiment of the disclosure, short-range communication technologies may include WLAN, WiFi, Bluetooth, Zigbee, WFD, UWB, infrared data association (IrDA), Bluetooth low energy (BLE), near-field communication (NFC), etc., but are not limited thereto.

According to an embodiment of the disclosure, network communication methods are not limited and may include communication methods using communication networks (e.g., a mobile communication network, wired Internet, wireless Internet, a broadcast network, etc.) that may be included in a network. For example, the network may include any one or more of networks, such as personal area network (PAN), LAN, campus area network (CAN), metropolitan area network (MAN), wide area network (WAN), a broadband network (BBN), the Internet, etc. The network may include any one or more of network topologies including a bus network, a star network, a ring network, a mesh network, a star-bus network, a tree or a hierarchical network, etc., but is not limited thereto.

Referring to FIG. 1, the electronic device 10 may include a BLE/WiFi communication module 110, a framework 120, a secure element (SE) 130, and a UWB communication module 140. The configuration of the electronic device 10 is not limited to the aforementioned example and may include more components or fewer components than the elements shown in FIG. 1.

The framework 120 may refer to a software (S/W) or hardware (H/W) environment that provides functions for mobile applications to operate in the form of an application programming interface (API). For example, the framework 120 may include a system development kit (SDK) or an application loaded on Android.

The framework 120 may include an application that provides a DK management service. For example, the framework 120 may manage a DK and store a generated DK in the SE 130.

The framework 120 may provide an API that an external entity (e.g., a provision server, a back-end server of a certain company, a service provider server, or the like) may access, and may provide functions, such as access control and command conversion for access to the SE 130.

The electronic device 10 may perform BLE-based secure communication with the target device 20 by using the BLE/WiFi communication module 110. A communication method using a secure channel is a method for the electronic device 10 to safely access the target device 20 and may generate a fast and safe secure session without exposing a key value for protecting a corresponding communication period to the outside. For example, for UWB secure ranging, primary UWB parameters each including a UWB session key may be exchanged through a BLE-level secure channel.

Also, the electronic device 10 may perform secure ranging with the target device 20 by using the UWB communication module 140.

The SE 130 is an independent secure storage device of the electronic device 10 and is a secure area accessible only by an authorized application. The SE 130 may be configured to be physically isolated from another hardware component.

An applet (or code, or application) may be installed in the SE 130 of the electronic device 10 for DK management. For example, a DK applet 132 and a secure UWB service (SUS) applet 134 may be installed in the SE 130 of the electronic device 10.

The DK applet 132 may store pieces of data required for the electronic device 10 to operate as a DK for controlling the target device 20. For example, the DK applet 132 may store a DK generated to access the target device 20. Also, the DK applet 132 may store DKs respectively corresponding to a plurality of target devices.

For example, a DK to access a vehicle may include a vehicle identifier for identifying a vehicle to which a DK is connected, a DK identifier for a vehicle original equipment manufacturer (OEM) server system to identify a DK, an electronic device public key, or the like.

Also, the DK applet 132 may issue and store a ranging session key that effectively operates for a session generated to perform ranging. For example, the DK applet 132 may store a UWB ranging session key (URSK) for performing secure ranging using a UWB communication method.

When the electronic device 10 performs secure ranging, the SUS applet 134 may support encrypted communication between the UWB communication module 140 and the SE 130.

A method by which each component of the electronic device 10 performs secure ranging with the target device 20 is now described below.

Figure 2:
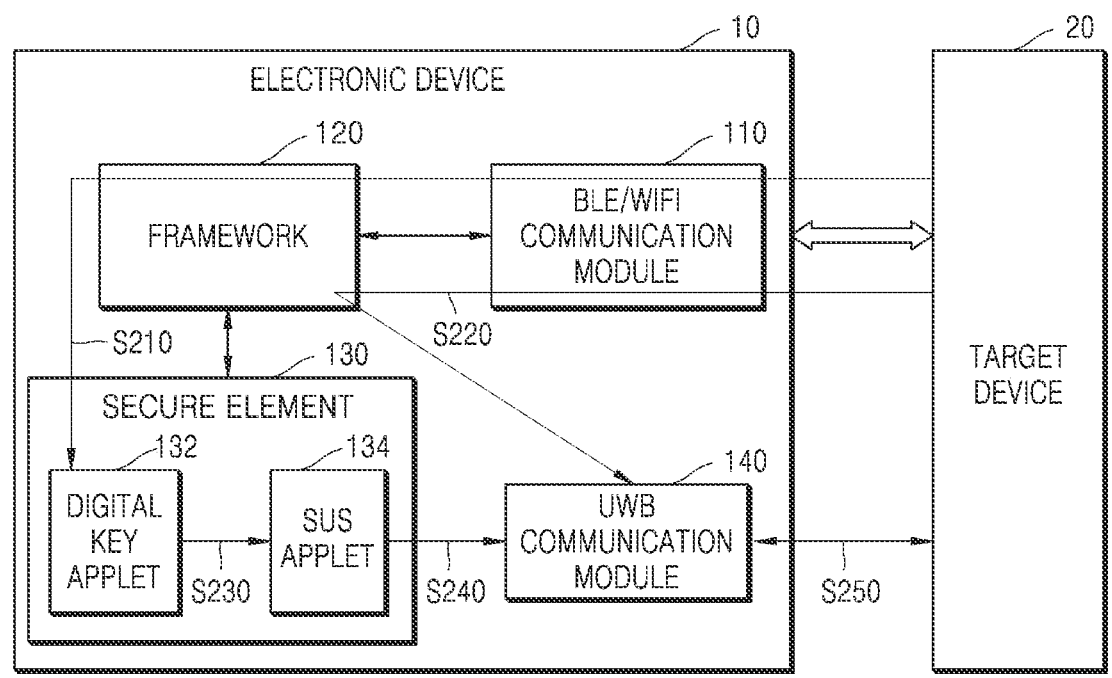
FIG. 2 illustrates an overview of a secure ranging operation between an electronic device and a target device.

FIG. 2 illustrates an overview of a secure ranging operation between an electronic device and a target device.

FIG. 2 is a diagram for describing an operation by which the electronic device 10 including the SE 130 in which the DK applet 132 and the SUS applet 134 are installed performs secure ranging with the target device 20, according to an embodiment.

In operation S210, when a certain request is received from the target device 20, the framework 120 may request the DK applet 132 to generate a ranging session key. The DK applet 132 may generate the ranging session key based on the request. Also, the DK applet 132 may store the generated ranging session key. In the disclosure, the ranging session key may refer to a session key (URSK) used when ranging is performed according to the UWB communication method.

In operation S220, the framework 120 may receive a UWB ranging session request from the target device 20 through the BLE/WiFi communication module 110. Also, the framework 120 may transmit the UWB ranging session request to the UWB communication module 140. In the disclosure, a ranging session request may refer to a request for generating a session to perform secure ranging between the electronic device 10 and the target device 20. For example, a session based on the UWB communication method may be established between the electronic device 10 and the target device 20, and in the generated session, the electronic device 10 may measure a distance from the target device 20 by using ranging technology.

In operation S230, when the UWB ranging session request is received from the target device 20, the DK applet 132 may transmit the ranging session key to the SUS applet 134. In operation S240, the UWB communication module 140 may fetch, from the SUS applet 134, the ranging session key stored in the SUS applet 134.

In operation S250, the electronic device 10 and the target device 20 may perform secure ranging. The UWB communication module 140 may perform UWB-based ranging with the target device 20 by using the ranging session key obtained from the SUS applet 134 in operation S240.

According to an embodiment of the disclosure, when performing secure ranging with the target device 20, the electronic device 10 may operate according to different secure ranging flows depending on whether secure ranging is activated, whether there is an activated ranging session key, or whether there is a stored ranging session key available. A method by which the electronic device 10 selects a secure ranging flow, according to an embodiment, is now described with reference to FIG. 3.

Figure 3:
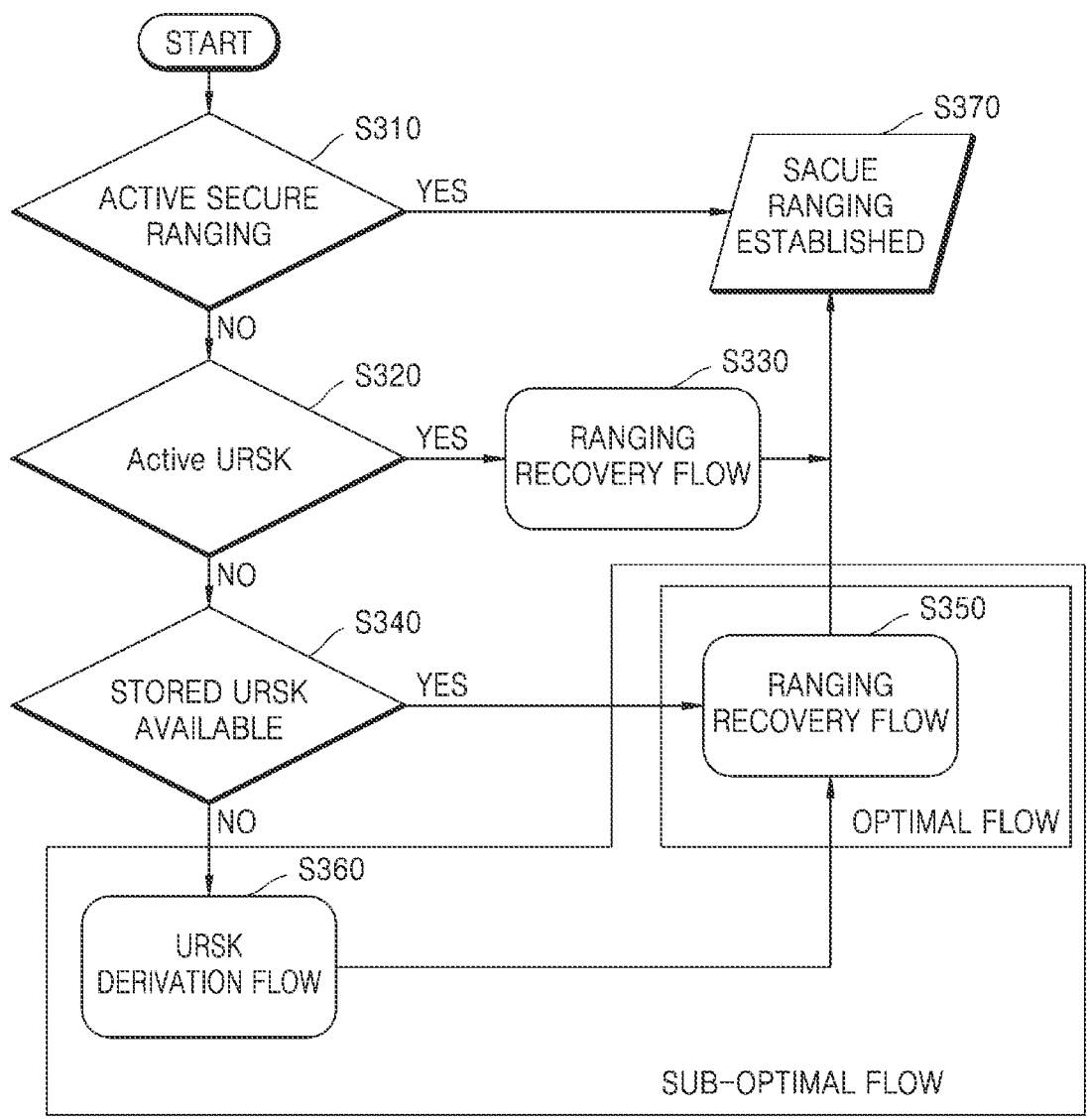
FIG. 3 is a flowchart of a secure ranging flow that may be selected by a target device.

FIG. 3 is a flowchart of a secure ranging flow that may be selected by a target device.

Before the target device 20 performs secure ranging with the electronic device 10, the target device 20 may determine how to perform secure ranging with the electronic device 10 according to a selected secure ranging flow.

In operation S310, the target device 20 may determine whether secure ranging is activated. When activated secure ranging is present, in operation S370, the target device 20 may perform secure ranging with the electronic device 10 by using established secure ranging.

When the secure ranging is not activated, in operation S320, the target device 20 may determine whether a ranging session key is activated (active URSK). When the ranging session key is activated, in operation S330, the target device 20 may perform a ranging recovery flow. The target device 20 may recover secure ranging and perform secure ranging with the electronic device 10 by using the already activated ranging session key.

When the ranging session key is not activated, in operation S340, the target device 20 may determine whether a valid ranging session key is stored in the DK applet 132 of the electronic device 10 (stored URSK available).

When a valid ranging session key is stored in the electronic device 10, in operation S350, the target device 20 may perform a secure ranging setup flow by using the already stored ranging session key. The electronic device 10 may set up secure ranging by fetching the ranging session key stored in the DK applet 132 to the UWB communication module 140. A detailed description of the secure ranging setup flow will be provided with reference to FIG. 4.

When a valid ranging session key is not stored in the electronic device 10, in operation S360, the target device 20 may request the electronic device 10 to perform a ranging session key derivation flow (URSK derivation flow) of newly obtaining a ranging session key.

According to an embodiment of the disclosure, an optimal flow in which the electronic device 10 may most efficiently perform secure ranging may be a flow of quickly setting up secure ranging by using the already stored ranging session key. The optimal flow may be the secure ranging setup flow in operation S350.

According to another embodiment, a sub-optimal flow in which the electronic device 10 may efficiently perform secure ranging may be a flow of setting up secure ranging by using the newly obtained ranging session key. The sub-optimal flow may include the ranging session key derivation flow in operation S360 and the secure ranging setup flow in operation S350.

Figure 4:
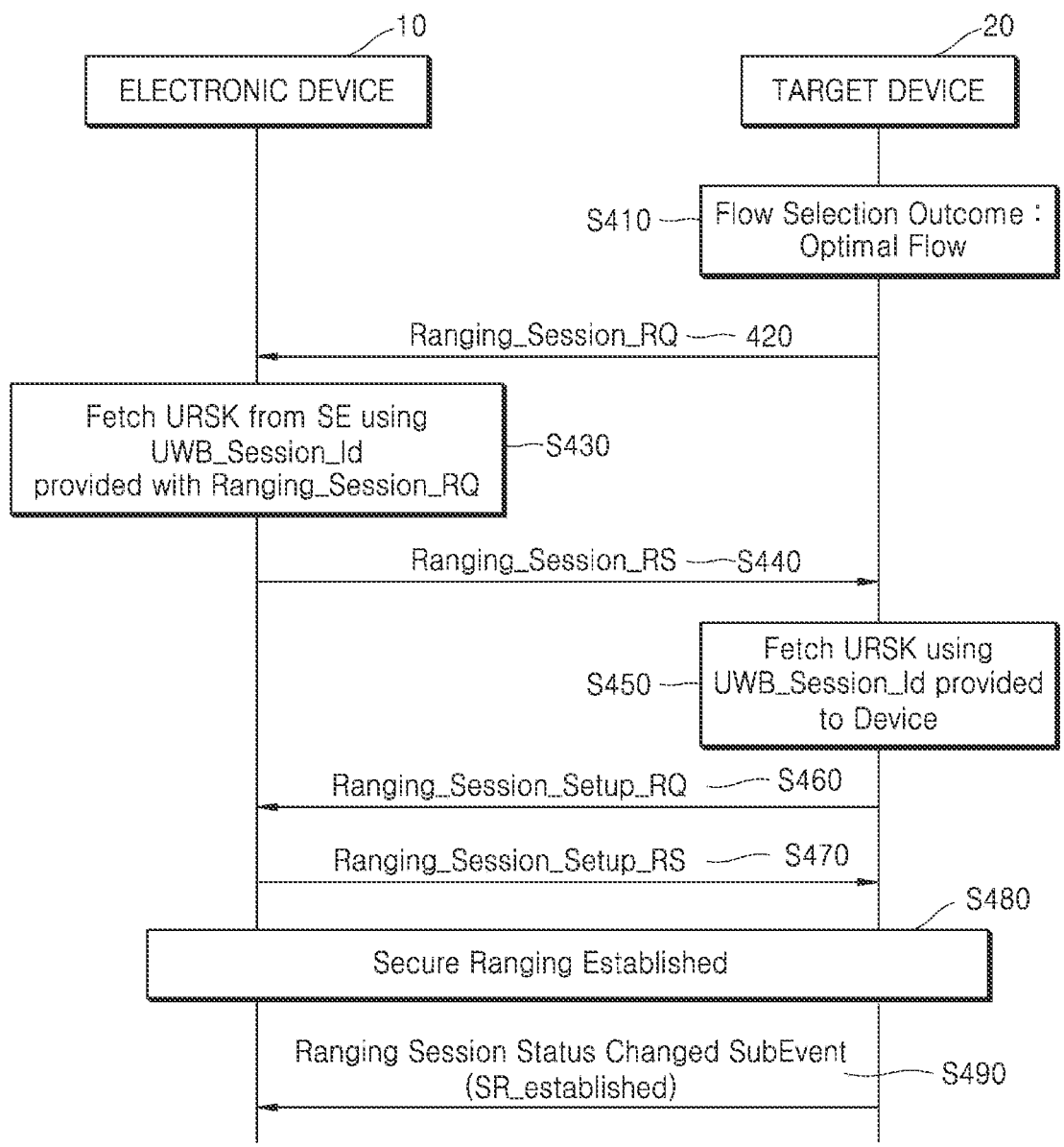
FIG. 4 is a diagram of a secure ranging setup flow.

FIG. 4 is a diagram of a secure ranging setup flow.

FIG. 4 is a detailed diagram of a method by which the electronic device 10 performs a secure ranging setup flow by using an already stored ranging session key, on the premise that a valid ranging session key is stored in the electronic device 10.

In operation S410, according to an embodiment, the target device 20 may determine a flow for secure ranging as an optimal flow according to selection of the secure ranging flow described above with reference to FIG. 3. The optimal flow may be the secure ranging setup flow (S350) of FIG. 3.

When the optimal flow is selected, the target device 20 and the electronic device 10 may perform the secure ranging setup flow. In operation S420, the target device 20 may transmit a ranging session request Ranging_Session_RQ to the electronic device 10.

In operation S430, the electronic device 10 may fetch, from the SE 130, a ranging session key (URSK) by using a session identifier UWB_Session_ID provided with the ranging session request from the target device 20. Operation S430 is described in more detail with reference to FIG. 5.

In operation S440, the electronic device 10 may transmit a ranging session response Ranging_Session_RS to the target device 20. For example, the ranging session response may include information about whether the electronic device 10 has successfully fetched the ranging session key for the session identifier requested by the target device 20.

In operation S450, the target device 20 may fetch the ranging session key (URSK) by using the session identifier UWB_Session_ID provided to the electronic device 10 together with the ranging session request in operation S420. When the ranging session key (URSK) is fetched and activated by the target device 20, the electronic device 10 and the target device 20 may start secure ranging.

In operation S460, the electronic device 10 may receive a ranging session setup request Ranging_Session_Setup_RQ from the target device 20. In operation S470, the target device 20 may receive a ranging session setup response Ranging_Session_Setup_RS from the electronic device 10. In operation S480, secure ranging may be established between the electronic device 10 and the target device 20.

In operation S490, a ranging session status between the electronic device 10 and the target device 20 may be changed to a secure ranging established status SR established.

Figure 5:
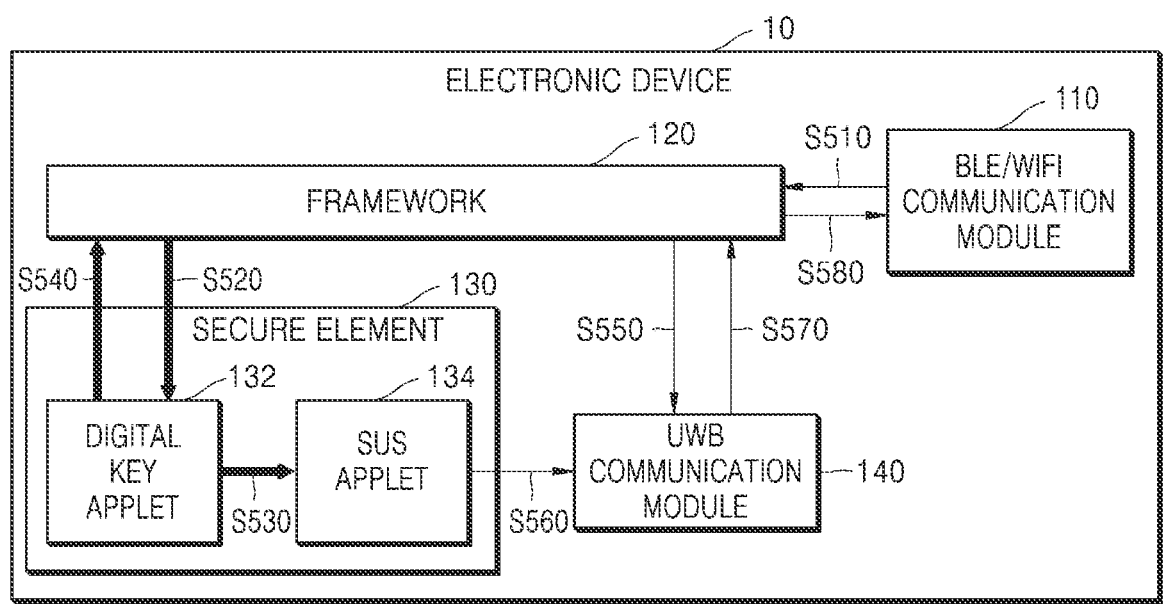
FIG. 5 is an overview diagram of a method of fetching a ranging session key.

FIG. 5 is an overview diagram of a method of fetching a ranging session key.

FIG. 5 is a diagram for describing in detail a process in which the electronic device 10 fetches a ranging session key from the SE 130 in operation S430 of FIG. 4. Operation S510 of FIG. 5 corresponds to operation S420 of FIG. 4, and operations S520 to S570 of FIG. 5 correspond to operation S430 of FIG. 4.

First, in operation S510, the framework 120 may receive a ranging session request from the target device 20 through the BLE/WiFi communication module 110. When the ranging session request is received from the target device 20, in operation S520, the framework 120 may request the DK applet 132 to transmit a ranging session key stored in the DK applet 132 to the SUS applet 134. In operation S530, the DK applet 132 may transmit the ranging session key to the SUS applet 134. In operation S540, the DK applet 132 may notify the framework 120 whether the ranging session key is successfully loaded into the SUS applet 134.

When the ranging session key is successfully loaded from the DK applet 132 to the SUS applet 134, in operation S550, the framework 120 may request the UWB communication module 140 to fetch the ranging session key. In operation S560, the UWB communication module 140 may fetch the ranging session key from the SUS applet 134.

In operation S570, the UWB communication module 140 may notify the framework 120 of a result of fetching the ranging session key.

In operation S580, the framework 120 may notify, through the BLE/WiFi communication module 110, the target device 20 that ranging is prepared to be performed. For example, the electronic device 10 may transmit, to the target device 20, a ranging session response including information about whether a ranging session key for a session identifier requested by the target device 20 is successfully fetched to the electronic device 10.

In this case, in a secure ranging setup procedure, a latency time occurs in operations S520 to S540 described above. For example, in operations S520 to S540, a latency time of 200 ms or more may occur. Accordingly, according to an embodiment of the disclosure, the disclosure provides a method by which the electronic device 10 performs some operations of the secure ranging setup flow in advance in a process of performing BLE setup, such that latency occurring in a secure ranging setup procedure may be prevented.

Figure 6:
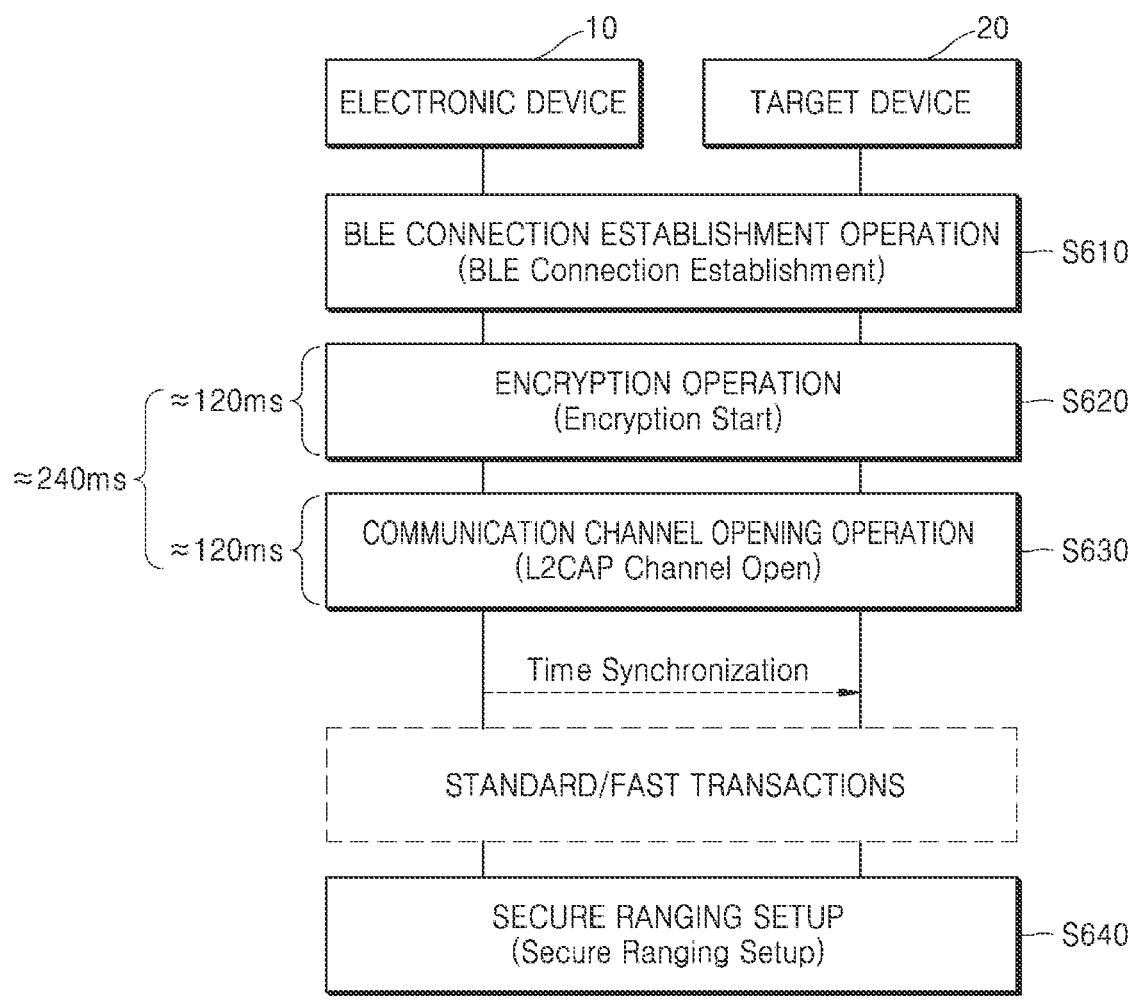
FIG. 6 is a conceptual diagram of a method by which an electronic device prevents latency from occurring in a secure ranging setup procedure, according to an embodiment of the disclosure.

FIG. 6 is a conceptual diagram of a method by which the electronic device 10 prevents latency from occurring in a secure ranging setup procedure, according to an embodiment of the disclosure.

Operations S610 to S630 refer to operations of establishing a secure channel between the electronic device 10 and the target device 20, and the operations may refer to operations of generating a secure channel between the electronic device 10 and the target device 20 based on a BLE communication method. After a BLE connection establishment operation between the electronic device 10 and the target device 20 is performed in operation S610, a BLE-level encryption operation between the electronic device 10 and the target device 20 may be performed in operation S620, and a communication channel opening operation between the electronic device 10 and the target device 20 may be performed in operation S630. For example, a communication channel may be opened at a logical link control and adaptation protocol (L2CAP) layer of BLE.

Thereafter, in operation S640, a secure ranging setup operation S640 between the electronic device 10 and the target device 20 may be performed.

The disclosure is provided to efficiently perform secure ranging by reducing the time required to prepare secure ranging, and is also provided to minimize the time required for a secure ranging setup procedure and reduce latency. Also, the disclosure is to minimize the time required for ranging recovery. In order to achieve the above effects, the electronic device 10 may perform some operations of the secure ranging setup flow in parallel when operation S620 of performing BLE-based encryption to operation S630 of opening the communication channel (L2CAP channel open) are performed.

For example, when a latency time caused by operations S520 to S540 of FIG. 5 is 220 ms or more, the electronic device 10 may perform operations S520 to S540 of FIG. 5 while performing operations S620 and S630, which take approximately 240 ms. According to an embodiment of the disclosure, the operation of the electronic device 10 is described in more detail with reference to FIG. 7.

Figure 7:
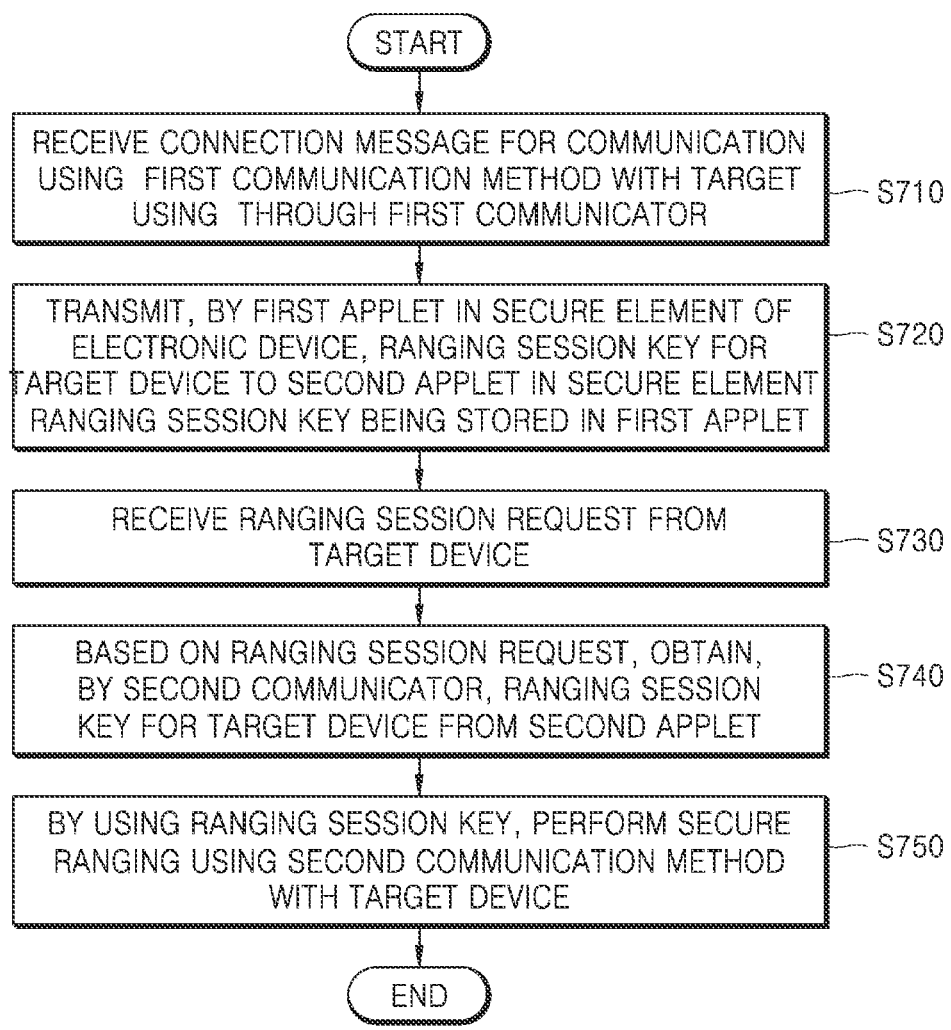
FIG. 7 is a flowchart of a method by which an electronic device performs secure ranging with a target device, according to an embodiment of the disclosure.

FIG. 7 is a flowchart of a method by which the electronic device 10 performs secure ranging with the target device 20, according to an embodiment of the disclosure.

In the disclosure, the electronic device 10 may include a first communicator and a second communicator. In the disclosure, the first communicator may refer to a communication module that supports a first communication method for generating a communication channel with the target device 20. According to an embodiment of the disclosure, the first communication method may refer to a BLE communication method. According to an embodiment of the disclosure, the second communicator may refer to a communication module that supports a second communication method for performing secure ranging with the target device 20. According to an embodiment of the disclosure, the second communication method may refer to a UWB communication method.

In the disclosure, the SE 130 may include a first applet and a second applet. In the disclosure, the first applet may correspond to the DK applet 132 described above. When a request for generating a ranging session key is received from the target device 20, the first applet may generate a ranging session key. Also, the first applet may store the generated ranging session key. A detailed description thereof has been already provided above and thus is omitted herein.

Also, in the disclosure, the second applet may correspond to the SUS applet 134. The second applet may transmit the ranging session key to the second communicator.

According to an embodiment of the disclosure, the first applet may store a pre-issued ranging session key (pre-derived URSK).

In operation S710, the electronic device 10 may receive a connection message for communication using the first communication method with the target device 20 through the first communicator.

In operation S710, the framework 120 may receive the connection message through the first communicator.

According to an embodiment of the disclosure, the connection message is a message for establishing a secure channel between the target device 20 and the electronic device 10, and may be a message for requesting opening of a secure channel. For example, the connection message may be a message for generating a communication channel between the target device 20 and the electronic device 10 based on the BLE communication method. For example, the target device 20 may periodically transmit the connection message to the electronic device 10 to generate a BLE communication-based communication channel with the electronic device 10.

According to an embodiment of the disclosure, the electronic device 10 may identify the target device 20 from the connection message. In this case, the connection message may include information in which identification information about the target device 20 is encrypted. When the electronic device 10 identifies the target device 20 from the connection message, the electronic device 10 may decrypt the connection message by using an encryption key pre-agreed with the target device 20. Also, the electronic device 10 may identify the target device 20 based on the decrypted connection message. A more detailed description thereof will be provided below with reference to FIG. 8.

In operation S720, the first applet in the SE of the electronic device 10 may transmit a ranging session key for the target device 20 to the second applet in the SE, the ranging session key being stored in the first applet. According to an embodiment of the disclosure, when the electronic device 10 has received the connection message for communication using the first communication method in operation S710, the electronic device 10 may prepare in advance secure ranging by the second communication method by transmitting the ranging session key to the second applet in the SE.

According to an embodiment of the disclosure, the framework 120 may identify the target device 20 based on the connection message. Also, the framework 120 may determine whether a valid ranging session key is available for the identified target device 20. Based on the determination that a valid ranging session key is available, the framework 120 may transmit, to the first applet, a ranging session key setting message indicating transmission of the ranging session key to the second applet.

In the disclosure, the ranging session key setting message may refer to an instruction indicating transmission of the ranging session key stored in the first applet to the second applet. A more detailed description of the ranging session key setting message will be provided below with reference to FIG. 10.

According to an embodiment, the ranging session key setting message may include at least one of a session identifier or a DK identifier for the target device 20. The first applet may set a ranging session key indexed by the ranging session key setting message to the second applet.

In the disclosure, the DK identifier refers to identification information for identifying a DK issued for the target device 20. Also, each target device may identify, by using the DK identifier, whether the DK has authority to access the target device. Because a plurality of ranging sessions may be generated for a single DK, there may be a plurality of ranging session keys indicated by a single DK identifier.

According to an embodiment of the disclosure, the first applet may transmit, to the second applet, the ranging session key indexed based on the received ranging session key setting message. For example, when the ranging session key setting message includes only the DK identifier, the first applet may transmit, to the second applet, one or more ranging session keys corresponding to the DK. As another example, when the ranging session key setting message includes both the DK identifier and the session identifier, the first applet may transmit, to the second applet, a ranging session key specified by the session identifier, among one or more ranging session keys corresponding to the DK.

According to an embodiment of the disclosure, based on a result of setting the ranging session key to the second applet by the first applet, the first applet may transmit a ranging session key setting response message to the framework 120. In this operation, the ranging session key may be stored in each of the first applet and the second applet, and the ranging session key may not be deleted from the first applet.

In the disclosure, the ranging session key setting response message may refer to a message for reporting a result of setting the ranging session key to the second applet. A more detailed description thereof will be provided below with reference to FIG. 11.

According to an embodiment, the ranging session key setting response message may include at least one of information about whether the ranging session key is successfully set, or a list of session identifiers stored in the second applet. In this case, the information about whether the ranging session key is successfully set is result information about whether the ranging session key is stored in the second applet, and may include a performance result regarding success or failure.

Also, for example, when a plurality of ranging session keys bonded to the DK identifier are set to the second applet, the list of session identifiers stored in the second applet may include identifiers of the plurality of ranging session keys bonded to the DK identifier. Also, as another example, when a ranging session key is specified by the session identifier and the specified ranging session key is set to the second applet, the list of session identifiers stored in the second applet may include the specified ranging session key.

Through the aforementioned embodiments, the electronic device 10 may set the ranging session key to the second applet in advance.

In operation S730, the electronic device 10 may receive a ranging session request from the target device 20. For example, the electronic device 10 may receive the ranging session request from the target device 20 through the first communicator.

In operation S740, based on the ranging session request, the second communicator may obtain the ranging session key for the target device 20 from the second applet.

According to an embodiment of the disclosure, based on the ranging session key setting response message received from the first applet in operation S720, the framework 120 may determine whether a ranging session key corresponding to the ranging session request is stored in the second applet. Based on the determination that the ranging session key corresponding to a ranging session requested by the target device 20 is stored in the second applet, the framework 120 may trigger the second communicator to obtain the ranging session key from the second applet.

According to an embodiment of the disclosure, when the second communicator has successfully obtained the ranging session key from the second applet, the framework 120 may transmit, to the first applet, a ranging session key deletion message requesting deletion of the ranging session key stored in the first applet.

In the disclosure, the ranging session key deletion message may refer to a message requesting deletion of the ranging session key stored in the first applet. A more detailed description of the ranging session key deletion message will be provided below with reference to FIG. 12.

According to an embodiment of the disclosure, the ranging session key deletion message may include a session identifier or a DK identifier for the target device 20. Also, the first applet may delete a ranging session key indexed by the ranging session key deletion message.

According to an embodiment of the disclosure, the first applet may delete the ranging session key based on the ranging session key deletion message. Based on a result of deleting the ranging session key, the first applet may transmit a ranging session key deletion response message to the framework (120).

In the disclosure, the ranging session key deletion response message may refer to a message for reporting a result of deleting the ranging session key stored in the first applet. The ranging session key deletion response message may include information about whether the ranging session key is successfully deleted.

In operation S750, the electronic device 10 may perform, by using the ranging session key, secure ranging using the second communication method with the target device 20 through the second communicator.

According to an embodiment of the disclosure, the framework 120 of the electronic device 10 may perform, by using the ranging session key, secure ranging using the second communication method with the target device 20.

Figure 8:
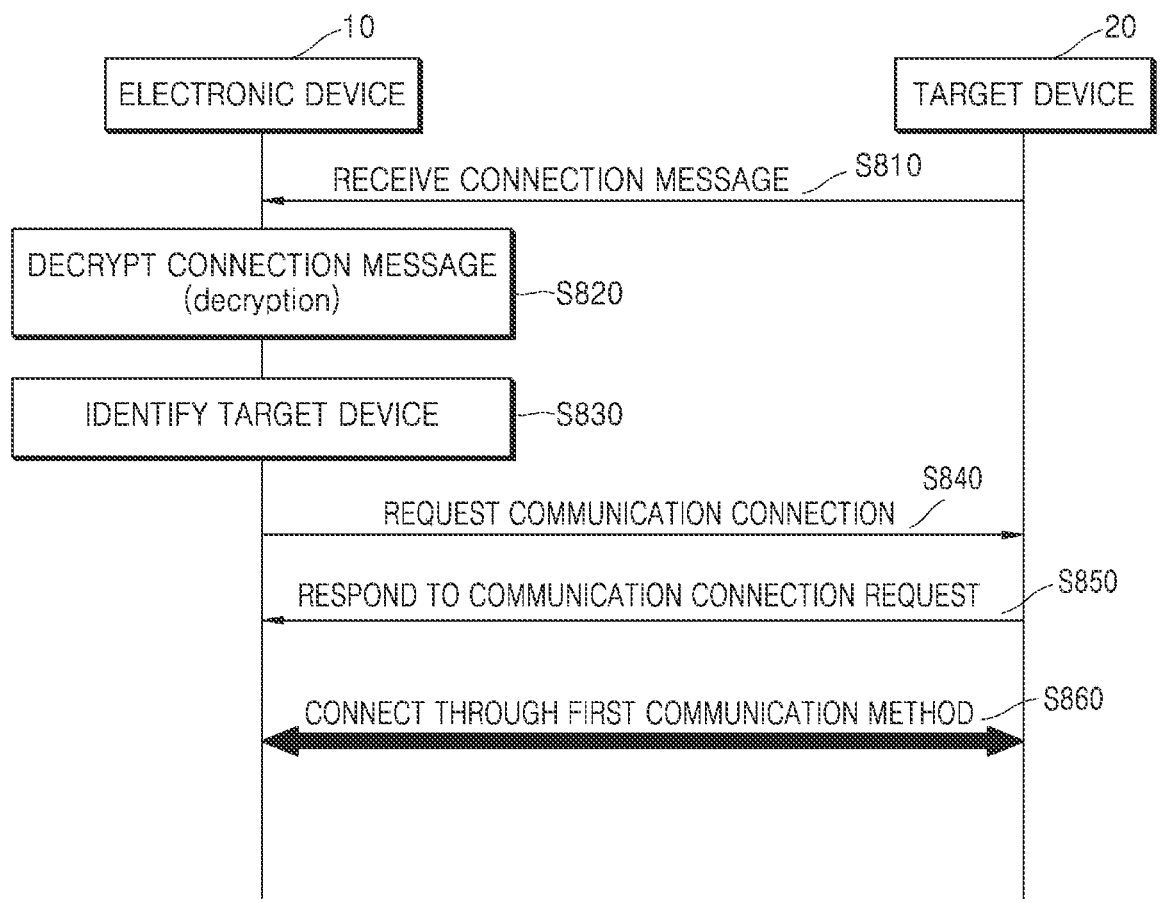
FIG. 8 is a flowchart of a Bluetooth low energy (BLE) connection establishment method, according to an embodiment of the disclosure.

FIG. 8 is a flowchart of a BLE connection establishment method, according to an embodiment of the disclosure.

As described above with reference to FIG. 7, according to an embodiment, the electronic device 10 may identify the target device 20 by performing the BLE connection establishment process shown in FIG. 8, and perform in advance some operations for secure ranging setup with the identified target device 20.

In operation S810, the electronic device 10 may receive a connection message from the target device 20.

In operation S820, the electronic device 10 may decrypt the connection message. For example, the connection message may include information in which identification information about the target device 20 is encrypted, and the electronic device 10 may obtain the identification information about the target device 20 by decrypting the connection message. In operation S830, the electronic device 10 may identify the target device 20 based on the decrypted identification information about the target device 20.

In operation S840, the electronic device 10 may request a communication connection from the identified target device 20. According to an embodiment of the disclosure, the electronic device 10 may request a communication connection based on the BLE communication method from the target device 20.

In operation S850, the electronic device 10 may receive a communication connection request response from the target device 20. In operation S860, the electronic device 10 may be connected to the target device 20 through the first communication method.

Figure 9:
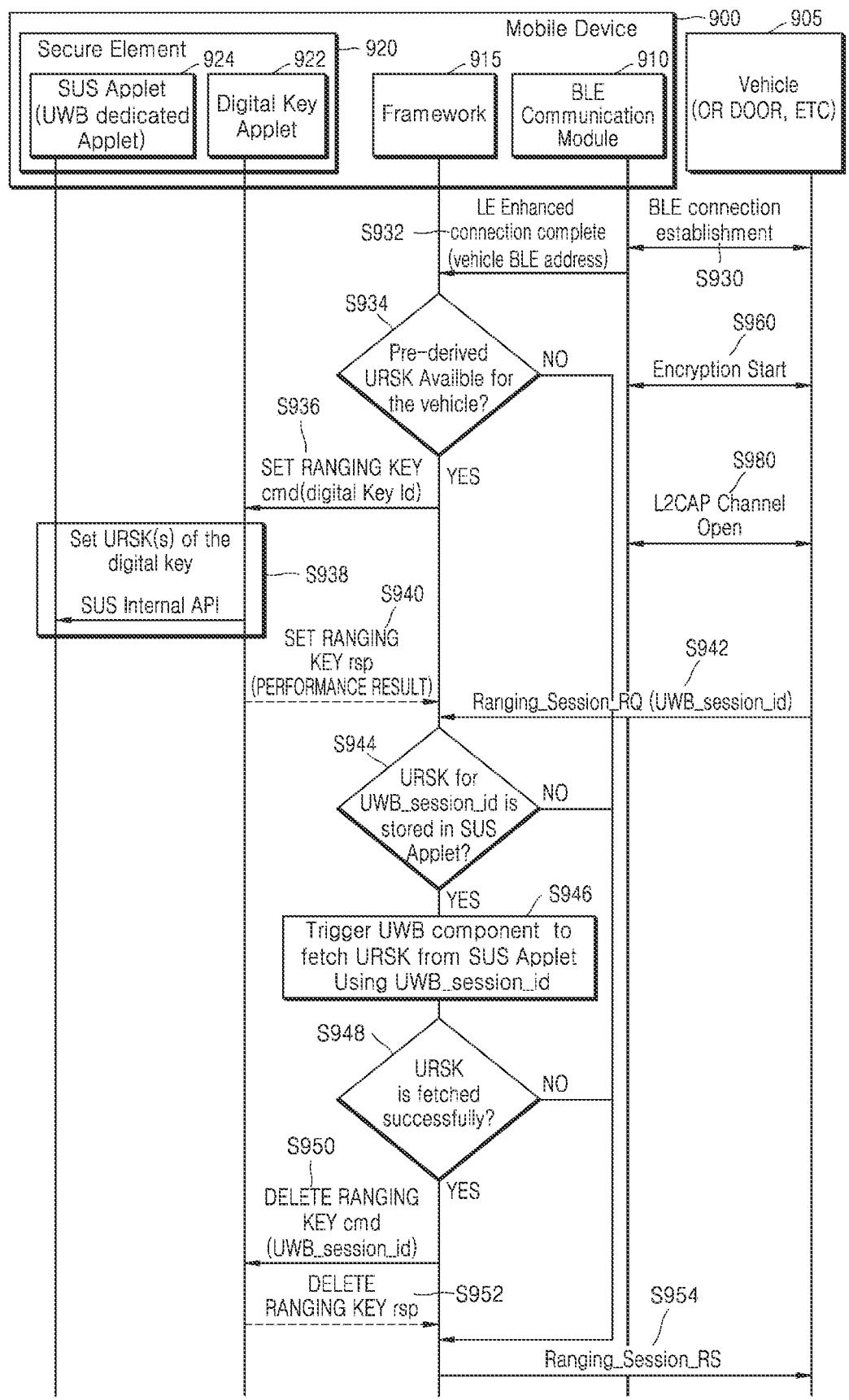
FIG. 9 is a flowchart of an embodiment in which an electronic device performs secure ranging with a target device, according to an embodiment of the disclosure.

FIG. 9 is a flowchart of an embodiment in which an electronic device performs secure ranging with a target device, according to an embodiment of the disclosure.

The embodiment of FIG. 9 relates to a method by which, before the electronic device 10 receives a ranging session request after securing a connection (BLE connection) according to the BLE communication method with the target device 20, the electronic device 10 prepares, in the SUS applet 134, a ranging session key for the target device 20.

According to an embodiment of the disclosure, the electronic device 10 may perform secure ranging with various types of target devices 20.

For example, the target device may include a vehicle 905. The vehicle 905 may refer to a separate electronic device identified from a vehicle. The vehicle 905 may refer to an electronic device mounted in the vehicle, connected to the vehicle, included in the vehicle, or controlling the vehicle. For example, the vehicle 905 may refer to a vehicle console, a vehicle key system, a vehicle-mounted terminal, or an automotive electronic system. Hereinafter, for convenience of description, the vehicle 905 is used. In FIG. 9, a case in which the electronic device 10 includes a mobile device 900 and the target device 20 includes the vehicle 905 is described as an example. Hereinafter, the URSK is referred to as the ranging session key.

In operation S930, a BLE communication module 910 may establish a BLE connection with the vehicle 905. In operation S932, the BLE communication module 910 may notify a framework 915 that an LE enhanced connection is completed, along with a BLE address of the vehicle. In the aforementioned operations, the mobile device 900 may perform a BLE connection with the vehicle 905 and specify the connected vehicle 905.

In operation S934, the framework 915 may determine whether there is a valid pre-issued ranging session key (pre-derived URSK) for the vehicle 905. For example, the framework 915 may determine whether pre-issued ranging session keys are available for performing secure ranging with the vehicle 905.

When a valid ranging session key is present, in operation S936, the framework 915 may transmit, to a DK applet 922 in an SE 920, an application protocol data unit (APDU) for loading the ranging session key into an SUS applet (or UWB dedicated applet) 924. According to an embodiment, in order to load the ranging session key into the SUS applet 924, the framework 915 may transmit a ranging session key setting message (SET RANGING KEY command) to the DK applet 922. The ranging session key setting message (SET RANGING KEY command) may include a DK identifier (DK id), and a more detailed description thereof will be provided below with reference to FIG. 10.

In operation S938, the DK applet 922 may transmit a ranging session key stored in the DK applet 922 to the SUS applet 924 based on the ranging session key setting message (SET RANGING KEY command).

In operation S940, the DK applet 922 may reply, to the framework 915, a result of loading the ranging session key into the SUS applet 924. According to an embodiment, in order to reply the result of loading the ranging session key, the DK applet 922 may transmit a ranging session key setting response message (SET RANGING KEY response) to the framework 915. The ranging session key setting response message may include information about a result of setting the ranging session key to the SUS applet 924, and a more detailed description thereof will be provided below with reference to FIG. 11.

In operation S942, the framework 915 may receive, from the vehicle 905, a ranging session request for establishing a ranging session for a specific session identifier (UWB session id).

In operation S944, the framework 915 may identify whether a ranging session key (pre-derived URSK) corresponding to the session identifier (UWB session id) for the ranging session requested by the vehicle 905 is loaded into the SUS applet 924.

When the ranging session key corresponding to the session identifier (UWB session id) requested by the vehicle 905 is set to the SUS applet 924, in operation S946, the framework 915 may trigger a UWB module (not shown) to fetch the ranging session key for the session identifier (UWB session id) from the SUS applet 924 by using the session identifier (UWB session id).

In operation S948, the framework 915 may identify whether the ranging session key is successfully fetched to the UWB module.

When the ranging session key is successfully fetched to the UWB module, in operations S950 and S952, the framework 915 may exchange, with the DK applet 922, an APDU for deleting the ranging session key fetched to the UWB module from the DK applet 922.

According to an embodiment of the disclosure, in operation S950, the framework 915 may transmit, to the DK applet 922, a ranging session key deletion message (DELETE RANGING KEY command) to delete the fetched ranging session key from the DK applet 922. The ranging session key deletion message (DELETE RANGING KEY command) may include a session identifier (UWB session id) indicating a ranging session key to be deleted, and a more detailed description thereof will be provided below with reference to FIG. 12.

According to an embodiment of the disclosure, in operation S952, the DK applet 922 may transmit a ranging session key deletion response message (DELETE RANGING KEY response) to reply a result of deleting the ranging session key to the framework 915.

In operation S954, the framework 915 may transmit, to the vehicle 905, a ranging session response including a result of fetching the ranging session key to the UWB module.

According to an embodiment of the disclosure, operation S954 may be performed before or after operations S950 and S952, or independently between operations S950 and S952.

Also, as described above, an encryption operation S960 and a BLE-based communication channel opening operation S980, which are operations of setting a BLE communication channel, may be performed in parallel with operations S932 to S940.

FIG. 10 is a diagram of a message for setting a ranging session key to a second applet, according to an embodiment of the disclosure.

FIG. 10 is a diagram of a structure of a ranging session key setting message (SET RANGING KEY command), which is a message indicating the first applet to transmit a ranging session key stored in the first applet to the second applet. For example, the message may be in an APDU format.

According to an embodiment of the disclosure, the ranging session key setting message may include a key identifier (key_identifier) field (hereinafter, referred to as the key_identifier field) and a UWB session identifier (UWB_Session_ID) field (hereinafter, referred to as the UWB_Session_ID field). The key_identifier field is a field necessarily included in the ranging session key setting message and may refer to a field including a DK identifier for the target device 20. Also, the UWB_Session_ID field is a field selectively included in the ranging session key setting message and may refer to a field including a session identifier, which is an identifier indicating a specific ranging session. The UWB_Session_ID field may include a specific UWB session identifier corresponding to a ranging session key to be set to the SUS applet 134. According to an embodiment of the disclosure, because the UWB session identifier is a value indexing a specific ranging session key, the UWB session identifier may refer to a ranging session key identifier (URSK ID) or a UWB key identifier (UWB key ID).

According to an embodiment of the disclosure, when the UWB_Session_ID field, which is a selective field, is not present, the DK applet 132 may set, to the SUS applet 134, all URSKs bonded to a specified DK identifier in the key_identifier field (If optional field does not exist, the digital key applet sets all URSKs bonded to the given digital key_identifier to SUS Applet).

According to an embodiment of the disclosure, when a session identifier value is displayed in the UWB_Session_ID field, the DK applet 132 may set a ranging session key (URSK) indexed with a given session identifier (UWB_Session_ID) to the SUS applet 134 (When this field presents, the digital key applet sets the URSK indexed with the given UWB_Session_ID to the SUS Applet).

FIG. 11 is a diagram of a message for reporting a ranging session key setting result, according to an embodiment of the disclosure.

FIG. 11 is a diagram of a structure of a ranging session key setting response message (SET RANGING KEY RESPONSE), which is a message for reporting a result of setting a ranging session key to the second applet. For example, the message may be in an APDU format.

The ranging session key setting response message may include information about a result of setting the ranging session key to the second applet, and an example of the information may include success or failure.

Also, referring to FIG. 11, the ranging session key setting response message may selectively include a UWB session identifier (UWB_Session_ID) field (hereinafter, referred to as the UWB_Session_ID field). The UWB_Session_ID field may include a list of UWB session identifiers set to the SUS applet 134. For example, a UWB session identifier included in the list of UWB session identifiers may be expressed as 4 bytes.

FIG. 12 is a diagram of a message for deleting a ranging session key, according to an embodiment of the disclosure.

FIG. 12 is a diagram of a structure of a ranging session key deletion message (DELETE RANGING KEY command), which is a message indicating deletion of a ranging session key stored in the first applet. For example, the message may be in an APDU format.

According to an embodiment of the disclosure, the ranging session key deletion message may include a key identifier (key_identifier) field (hereinafter, referred to as the key_identifier field) and a UWB session identifier (UWB_Session_ID) field (hereinafter, referred to as the UWB_Session_ID field). The key_identifier field is a field necessarily included in the ranging session key setting message and may refer to a field including a DK identifier for the target device 20. Also, the UWB_Session_ID field is a field selectively included in the ranging session key setting message and may refer to a field including a session identifier indicating a specific ranging session. For example, the UWB_Session_ID field may include a specific UWB session identifier to be deleted from the DK applet 132.

According to an embodiment of the disclosure, when the UWB_Session_ID field, which is a selective field, is not present, the DK applet 132 may delete all URSKs bonded to a specified DK identifier from the key_identifier field (If optional field does not exist, the digital key applet deletes all URSKs bonded to the given digital key_identifier).

According to an embodiment of the disclosure, when a session identifier value is displayed in the UWB_Session_ID field, the DK applet 132 may delete a ranging session key (URSK) indexed with a given session identifier (UWB_Session_ID) (When this field presents, the digital key applet deletes the URSK indexed with the given UWB_Session_Id).

Figure 13:
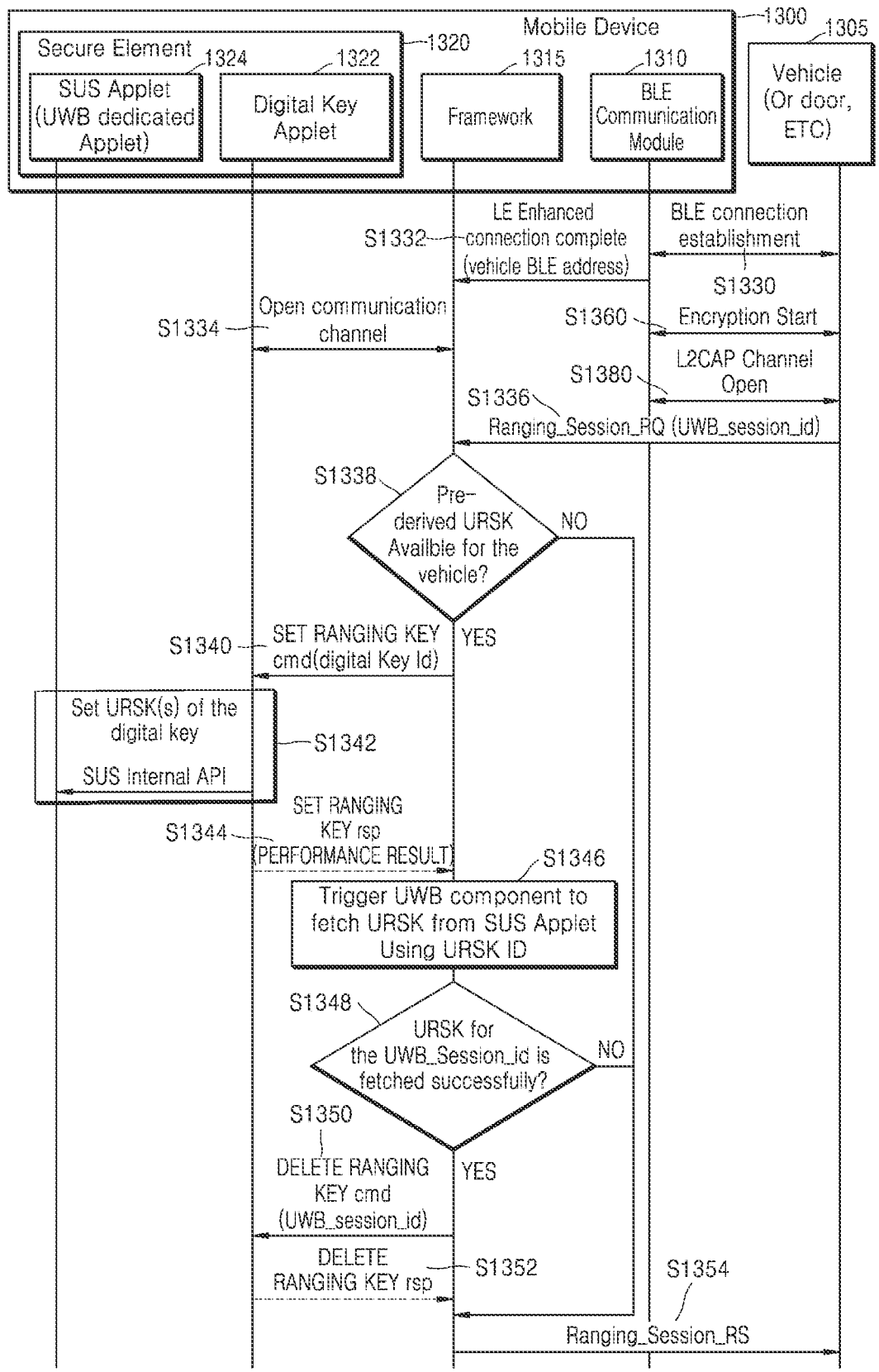
FIG. 13 is a flowchart of an embodiment in which an electronic device performs secure ranging with a target device, according to an embodiment of the disclosure.

FIG. 13 is a flowchart of an embodiment in which an electronic device performs secure ranging with a target device, according to an embodiment of the disclosure.

The embodiment of FIG. 13 relates to an embodiment in which, after the electronic device 10 is connected to the target device 20 according to the BLE communication method (BLE connection), the electronic device 10 first prepares for secure communication with the SE 130. In FIG. 13, a case in which the electronic device 10 includes a mobile device 1300 and the target device 20 includes the vehicle 1305 is described as an example. Hereinafter, the URSK is referred to as the ranging session key.

In operation S1330, a BLE communication module 1310 may establish a BLE connection with the vehicle 1305. In operation S1332, the BLE communication module 1310 may notify a framework 1315 that an LE enhanced connection is completed, along with a BLE address of the vehicle 1305. In aforementioned operations, the mobile device 1300 may perform a BLE connection with the vehicle 1305 and specify the connected vehicle 1305.

In operation S1334, the framework 1315 may open a channel fora communication connection with an SE 1320. When the framework 1315 opens a channel according to a secure communication method with the SE 1320, mutual authentication between the framework 1315 and the SE 1320 needs to be performed.

In operation S1336, the framework 1315 may receive, from the vehicle 1305, a ranging session request for establishing a ranging session for a specific session identifier (UWB session ID).

In operation S1338, the framework 1315 may determine whether there is a valid pre-issued ranging session key (pre-derived URSK) for the vehicle 1305. For example, the framework 1315 may determine whether pre-issued ranging session keys are available for performing secure ranging with the vehicle 1305.

When a valid ranging session key is present, in operation S1340, the framework 1315 may transmit, to a DK applet 1322 in the SE 1320, an APDU for loading the ranging session key into an SUS applet 1324. According to an embodiment, in order to load the ranging session key into the SUS applet 1324, the framework 1315 may transmit a ranging session key setting message (SET RANGING KEY command) to the DK applet 1322. The ranging session key setting message (SET RANGING KEY command) may include a DK identifier (DK id), and a detailed description thereof has been provided above with reference to FIG. 10.

In operation S1342, the DK applet 1322 may transmit a ranging session key stored in the DK applet 1322 to the SUS applet 1324 based on the ranging session key setting message (SET RANGING KEY command).

In operation S1344, the DK applet 1322 may reply, to the framework 1315, a result of loading the ranging session key into the SUS applet 1324. According to an embodiment, in order to reply the result of loading the ranging session key, the DK applet 1322 may transmit a ranging session key setting response message (SET RANGING KEY response) to the framework 1315. The ranging session key setting response message (SET RANGING KEY response) may include information about a result of setting the ranging session key to the SUS applet 1324, and a more detailed description thereof has been provided above with reference to FIG. 11.

In operation S1346, the framework 1315 may trigger the UWB module (not shown) to fetch the ranging session key from the SUS applet 1324 by using the session identifier (UWB session id).

In operation S1348, the framework 1315 may identify whether the ranging session key is successfully fetched to the UWB module.

When the ranging session key is successfully fetched to the UWB module, in operations S1350 and S1352, the framework 1315 may exchange, with the DK applet 1322, an APDU for deleting the fetched ranging session key from the DK applet 1322.

According to an embodiment of the disclosure, in operation S1350, the framework 1315 may transmit, to the DK applet 1322, a ranging session key deletion message (DELETE RANGING KEY command) to delete the fetched ranging session key from the DK applet 1322. The ranging session key deletion message (DELETE RANGING KEY command) may include a session identifier (UWB session id) indicating a ranging session key to be deleted, and a more detailed description thereof has been provided above with reference to FIG. 12.

According to an embodiment of the disclosure, in operation S1352, the DK applet 1322 may transmit a ranging session key deletion response message (DELETE RANGING KEY response) to reply a result of deleting the ranging session key to the framework 1315.

In operation S1354, the framework 1315 may transmit, to the vehicle 1305, a ranging session response including a result of fetching the ranging session key to the UWB module.

According to an embodiment of the disclosure, operation S1354 may be performed before or after operations S1352 and S1350, or independently between operations S1352 and S1350.

Also, BLE encryption may be performed in operation S1360 in parallel with operations S1332 to S1334, and a BLE-based communication channel may be opened in operation S1380.

Figure 14:
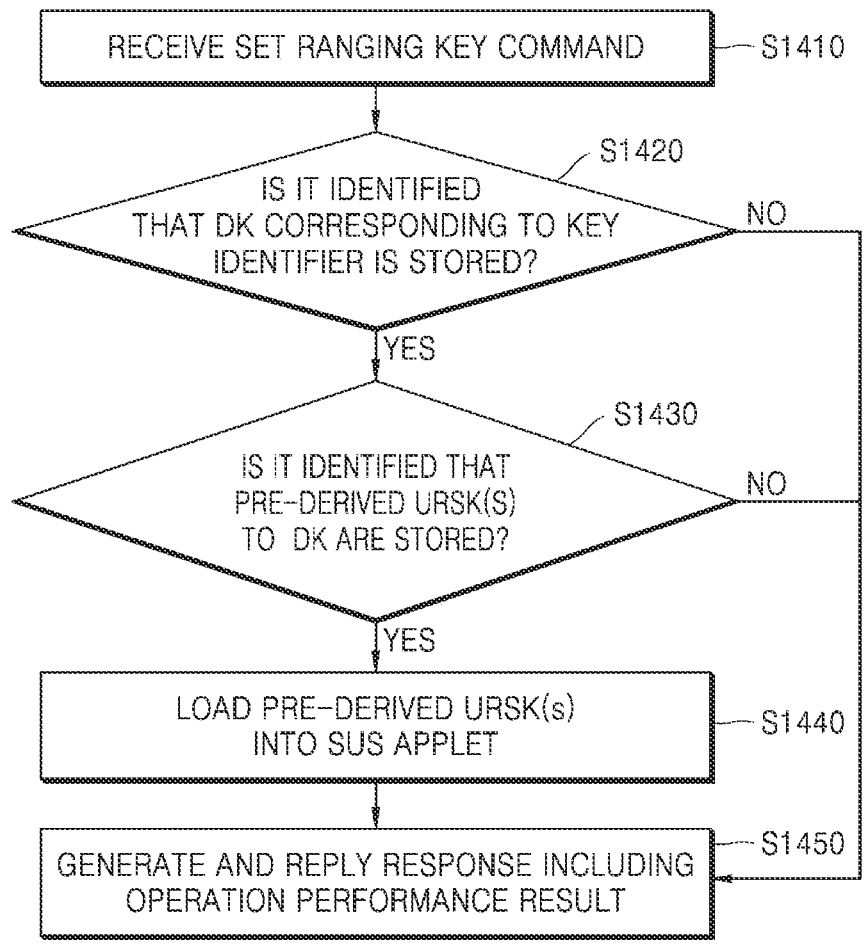
FIG. 14 is a flowchart of a method by which a first applet in an electronic device sets a ranging session key to a second applet, according to an embodiment of the disclosure.

FIG. 14 is a flowchart of a method by which a first applet in the electronic device 10 sets a ranging session key to a second applet, according to an embodiment of the disclosure.

For convenience of description, the first applet is referred to as the DK applet 132, and the second applet is referred to as the SUS applet 134.

First, in operation S1410, the DK applet 132 may receive a ranging session key setting message (SET RANGING KEY command) from the framework 120. In operation S1420, the DK applet 132 may identify whether a DK corresponding to a DK identifier is stored in the DK applet 132. The DK corresponding to the DK identifier is stored in the DK applet 132, in operation S1430, the DK applet 132 may identify whether one or more pre-issued ranging session keys (pre-derived URSK(s)) connected to the DK are stored in the DK applet 132. When the one or more pre-issued ranging session keys connected to the DK are stored in the DK applet 132, in operation S1440, the DK applet 132 may load the one or more pre-issued ranging session keys into the SUS applet 134. In operation S1450, the DK applet 132 may generate a response including an operation performance result and reply the response to the framework 120.

Figure 15:
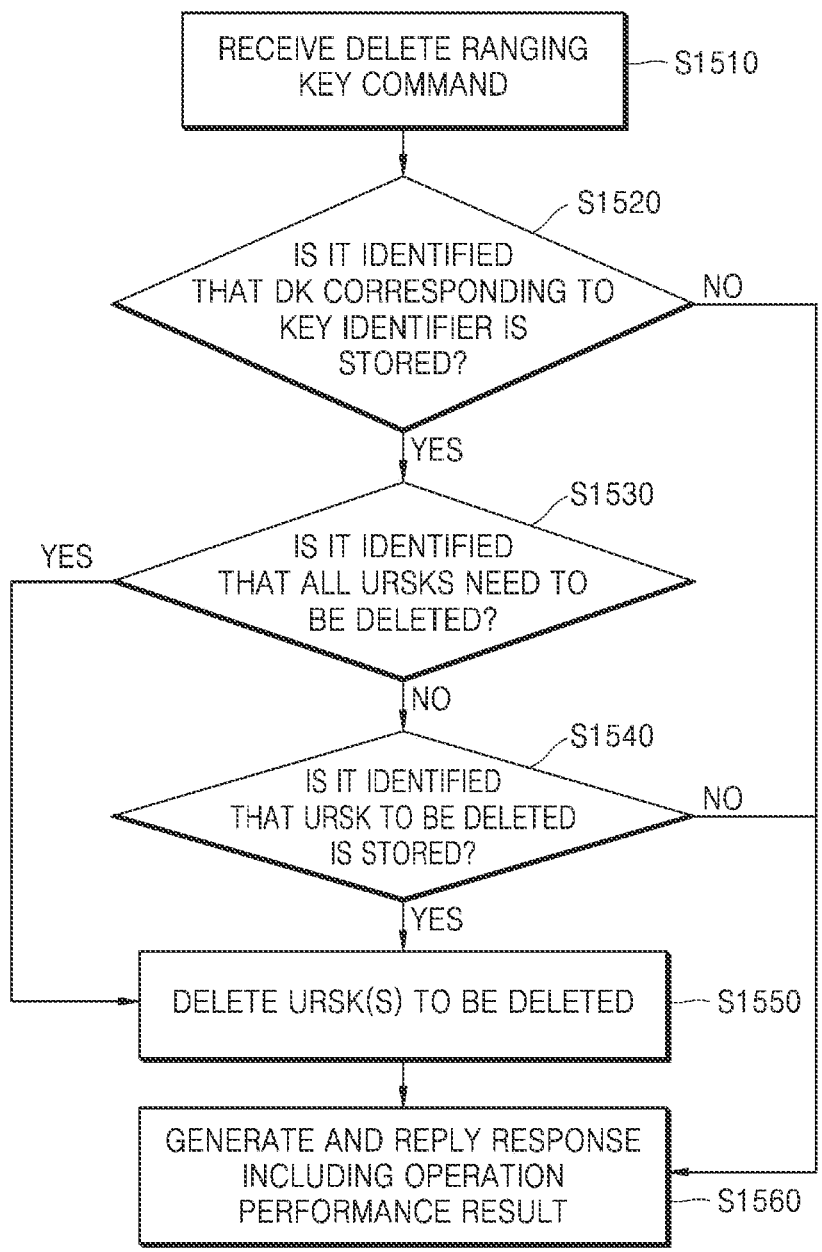
FIG. 15 is a flowchart of a method by which a first applet in an electronic device deletes a ranging session key, according to an embodiment of the disclosure.

FIG. 15 is a flowchart of a method by which a first applet in an electronic device deletes a ranging session key, according to an embodiment of the disclosure.

First, in operation S1510, the DK applet 132 may receive a ranging session key deletion message (DELETE RANGING KEY command) from the framework 120. In operation S1520, the DK applet 132 may identify whether a DK corresponding to a DK identifier is stored. When the DK corresponding to the DK identifier is stored, in operation S1530, the DK applet 132 may identify whether all stored ranging session keys need to be deleted. When it is identified that all the stored ranging session keys are not deleted, in operation S1540, the DK applet 132 may identify whether a ranging session key to be deleted is stored. When it is identified that the ranging session key to be deleted is stored, in operation S1550, the DK applet 132 may delete at least one ranging session key indicated as an object to be deleted. In operation S1560, the DK applet 132 may generate a ranging session key deletion response message including a result of deleting the ranging session key, and reply the ranging session key deletion response message to the framework 120.

Figure 16:
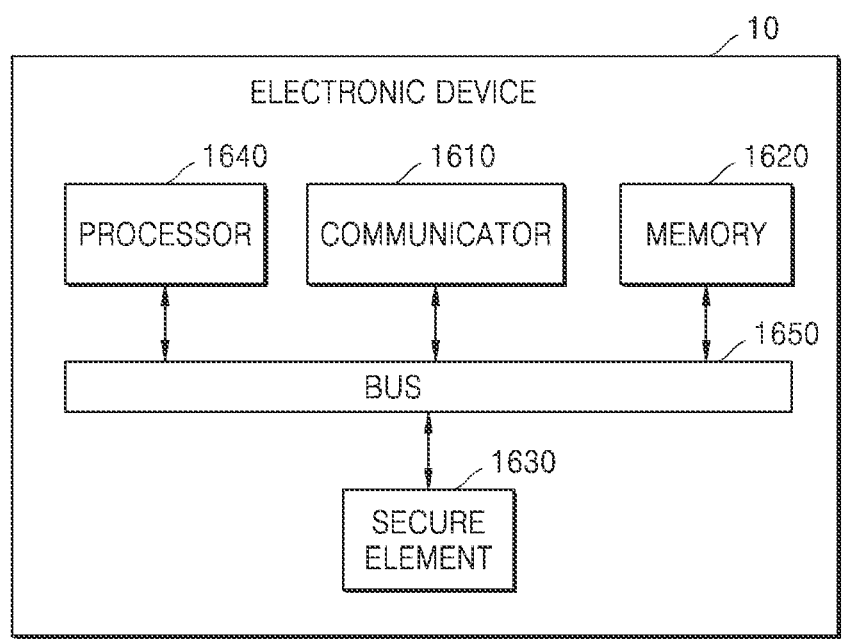
FIG. 16 is a diagram of a configuration of an electronic device for performing secure ranging with a target device, according to an embodiment of the disclosure.

FIG. 16 is a diagram of a configuration of the electronic device 10 for performing secure ranging with the target device 20, according to an embodiment of the disclosure.

According to an embodiment of the disclosure, the electronic device 10 may include a personalized mobile device, but is not limited thereto and may include various types of electronic devices. For example, the electronic device 10 may include a smart phone, a tablet personal computer (PC), a camera, or a wearable device.

Referring to FIG. 16, the electronic device 10 may include a communicator 1610, a memory 1620, an SE 1630, a processor 1640, and a bus 1650 connecting the components to each other.

The communicator 1610 may perform wired/wireless communication with another device or network. In this regard, the communicator 1610 may include a communication module supporting at least one of various wired/wireless communication methods. For example, the communication module may be a chipset, or may be a sticker/barcode (e.g., a sticker with an NFC tag) storing information necessary for communication.

The wireless communication may include, e.g., at least one of cellular communication, WiFi, WFD, Bluetooth, BLE, UWB, or NFC. The wired communication may include, e.g., at least one of universal serial bus (USB) or high-definition multimedia interface (HDMI).

In an embodiment, the communicator 1610 may include a communication module for short-range communication. For example, the communicator 1610 may include a communication module for performing various types of short-range communication, such as infrared communication and magnetic secure transmission (MST), in addition to WiFi, WFD, Bluetooth, and NFC described above.

In the memory 1620, a program such as an application and various types of data such as files may be installed and stored. The processor 1640 may access and use data stored in the memory 1620, or may store new data in the memory 1620. In an embodiment, in the memory 1620, a program (e.g., a framework) and data for managing a DK may be installed and stored.

For example, the memory 1620 may include at least one type of storage medium among a flash memory, a hard disk-type memory, multimedia card micro-type memory, a card-type memory (e.g., a secure digital (SD) or extreme digital (XD) memory), a random access memory (RAM), a static RAM (SRAM), a read-only memory (ROM), an electrically erasable programmable ROM (EEPROM), a programmable ROM (PROM), a magnetic memory, a magnetic disk, and an optical disk.

According to an embodiment, the electronic device 10 includes an SE, and the SE may perform processes, such as generation, deletion, or management of a DK for controlling or accessing an external device, and perform authentication for the DK. Furthermore, the SE may provide a function of safely managing a DK by authenticating access to the DK by an external entity, such as a service provider server, and verifying authority.

The SE 1630 is an independent secure storage device of the electronic device 10 and is a secure area accessible only by an authorized application. The SE 1630 may be configured to be physically isolated from another hardware component. According to an embodiment, a program and data (e.g., a secure domain and an applet) for managing a DK may be installed and stored in the SE 1630.

The processor 1640 may control overall operations of the electronic device 10 and include at least one processor, such as a central processing unit (CPU) or a graphics processing unit (GPU). The processor 1640 may control other components included in the electronic device 10 to perform an operation for managing a DK. For example, the processor 1640 may execute a program stored in the memory 1620 and the SE 1630, read a file stored in the memory 1620 and the SE 1630, or store a new file in the memory 1620 and the SE 1630.

According to an embodiment, the processor 1640 may receive a DK processing request from an external device or an application by using the framework, and transmit, to a secure domain or an instance in the SE, the DK processing request and authentication information stored in the framework. The processor 1640 may process the DK based on the DK processing request, the authentication information received from the framework, and authentication information stored in the SE by using an applet running on the SE 1630. In this case, processing of the DK may include at least one operation of generation, deletion, and management of the DK.

The bus 1650 is a common data transmission path connecting the communicator 1610, the memory 1620, the SE 1630, and the processor 1640 to each other.

According to an embodiment of the disclosure, the communicator 1610 may include the first communicator and the second communicator described above.

According to an embodiment of the disclosure, the SE 1630 may correspond to the aforementioned SE 130, the first applet and the second applet may be stored therein.

According to an embodiment of the disclosure, the processor 1640 may control the first communicator to receive a connection message for communication using the first communication method with the target device 20. Also, the processor 1640 may control the first applet in the SE 1630 of the electronic device 10 to transmit a ranging session key for the target device 20 to the second applet in the SE 1630, the ranging session key being stored in the first applet. The processor 1640 may control the first communicator to receive a ranging session request from the target device 20, and may control the second communicator to obtain a ranging session key for the target device (20) from the second applet based on the ranging session request. The processor 1640 may control the second communicator to perform, by using the ranging session key, secure ranging using the second communication method with the target device 20.

According to an embodiment of the disclosure, the processor 1640 may decrypt the connection message by using an encryption key pre-agreed with the target device 20, and identify the target device 20 based on the decrypted connection message.

According to an embodiment of the disclosure, the processor 1640 may identify the target device 20 based on the connection message, and determine whether a valid ranging session key is available for the identified target device 20. Also, based on the determination that a valid ranging session key is available, the processor 1640 may transmit, to the first applet, a ranging session key setting message indicating transmission of the ranging session key to the second applet.

According to an embodiment of the disclosure, the ranging session key setting message may include at least one of a session identifier or a DK identifier for the target device 20. The first applet may set a ranging session key indexed based on the ranging session key setting message to the second applet.

According to an embodiment of the disclosure, the first applet may transmit, to the second applet, the ranging session key based on the ranging session key setting message. Based on a result of setting the ranging session key to the second applet by the first applet, the first applet may transmit a ranging session key setting response message to the processor 1640. The ranging session key setting response message may include at least one of information about whether the ranging session key is successfully set, or a list of session identifiers stored in the second applet.

According to an embodiment of the disclosure, the processor 1640 may determine, based on the ranging session key setting response message, whether a ranging session key corresponding to the ranging session request is stored in the second applet. Based on the determination that the ranging session key is stored in the second applet, the processor 1640 may trigger the second communicator to obtain the ranging session key from the second applet.

According to an embodiment of the disclosure, when the second communicator has successfully obtained the ranging session key from the second applet, the processor 1640 may transmit, to the first applet, a ranging session key deletion message requesting deletion of the ranging session key stored in the first applet.

Figure 17:
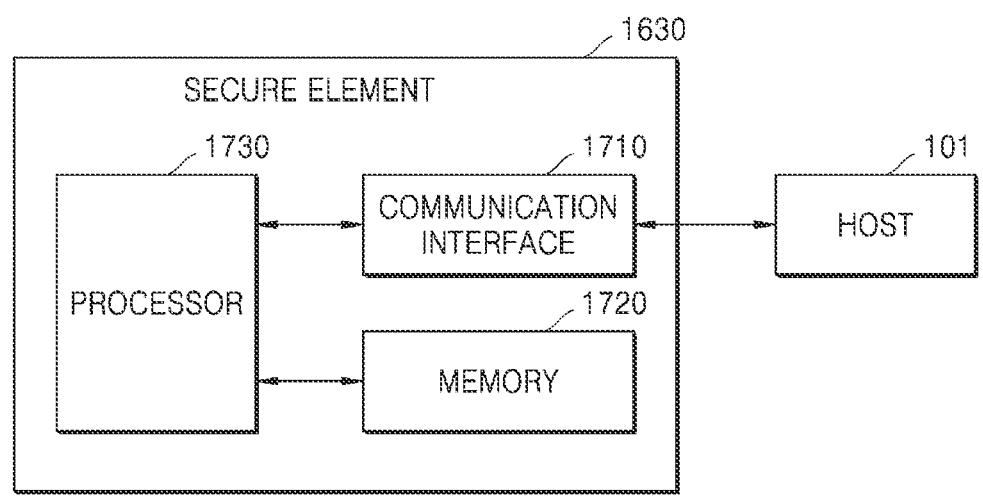
FIG. 17 is a block diagram of a secure element according to an embodiment of the disclosure.

FIG. 17 is a block diagram of the SE 1630 according to an embodiment of the disclosure.

The SE 1630 may correspond to the SE 130 described above with reference to FIG. 1.

Referring to FIG. 17, the SE 1630 may include a communication interface 1710, a memory 1720, and a processor 1730.

According to an embodiment, the SE 1630 is an independent secure storage device of the electronic device 10 and is a secure area accessible only by an authorized application. For example, the SE 1630 may include an embedded SE (eSE), a universal integrated circuit card (UICC), a secure digital card (SD card), or an embedded UICC (eUICC).

The communication interface 1710 may communicate with a host 101. In an embodiment, the communication interface 1710 may include at least one of various types of wired/wireless communication interfaces for communicating with the host 101. In this regard, the host 101 may be one of devices included in the electronic device 10 and may include, e.g., an application processor (AP), a memory, or the like. The communication interface 1710 may include, e.g., a serial interface, such as ISO 7816, a USB, an inter-integrated circuit (I2C), a serial peripheral interface (SPI), or a single wire protocol (SWP), or any serial interface generally used for communication between two hardware devices. Also, the communication interface 1710 may include a wireless interface, such as ISO 14443, ZigBee, or Bluetooth, which directly connects an antenna to a hardware device. Furthermore, the communication interface 1710 may include a parallel interface connected to a center bus of the electronic device 10, and in this case, the communication interface 1710 may also include a buffer for receiving a command and data from the host 101.

In the memory 1720, a program such as an applet and various types of data such as files may be installed and stored. The processor 1730 may access and use data stored in the memory 1720, or may store new data in the memory 1720. In an embodiment, in the memory 1720, a program and data for processing a DK may be installed and stored. The memory 1720 may be a nonvolatile storage device.

The processor 1730 may control overall operations of the SE 1630 and may include at least one processor, such as a CPU or a GPU. The processor 1730 may control other components included in the SE 1630 to perform an operation for processing a DK. For example, the processor 1730 may execute a program stored in the memory 1720, read a file stored in the memory 1720, or store a new file in the memory 1720. In an embodiment, the processor 1730 may execute a program stored in the memory 1720 to perform an operation for processing a DK.

According to an embodiment, the electronic device 10 including the SE 1630 may further include a framework. The framework is a service application that functions as a gateway when there is access to the SE 1630 from an external entity. The framework may provide an application programming interface (API) that an external entity may access, and may provide functions, such as access control and command conversion for access to the SE 1630. The external entity may include, e.g., an SE issuer, a service provider, and/or an access service provision device.

According to an embodiment, a lightweight application (or applet) may be installed and run in the SE 1630. The applet may store a DK inside the SE 1630 and provide services, such as use, deletion, and management of a stored key. The applet may be preloaded in the SE 1630, or may be loaded or installed later as needed.

According to an embodiment of the disclosure, the first applet and the second applet may be installed in the SE 1630.

Moreover, the aforementioned embodiments may be written into a program executable by a computer and may be implemented in a universal digital computer for carrying out the program by using a computer-readable medium. Also, the structure of data used in the aforementioned embodiments may be recorded on a computer-readable medium through various means. Also, the aforementioned embodiments may be implemented in a form of a computer program product including a recording medium including instructions executable by a computer, such as a program module executed by a computer. For example, methods implemented by a software module or algorithm may be stored in a computer-readable recording medium as codes or program commands that may be read and executed by a computer.

A computer-readable medium may be an arbitrary recording medium accessible by a computer, and may include volatile and nonvolatile media and separable and non-separable media. The computer-readable medium may include a magnetic storage medium, such as ROM, a floppy disk, and a hard disk, and may include an optically-readable medium, such as a storage medium including a compact disc ROM (CD-ROM) and a digital versatile disc (DVD), but are not limited thereto. In addition, the computer-readable medium may include a computer storage medium and a communication medium.

Also, a plurality of computer-readable recording media may be distributed over computer systems connected by a network, and data, e.g., program instructions and codes, stored in the distributed recording media may be executed by at least one computer.

A machine-readable storage medium may be provided in a form of a non-transitory storage medium. In this case, the 'non-transitory storage medium' only denotes a tangible device and does not contain a signal (e.g., electromagnetic waves). This term does not distinguish a case in which data is stored in the storage medium semi-permanently and a case in which the data is stored in the storage medium temporarily. For example, the 'non-transitory storage medium' may include a buffer in which data is temporarily stored.

According to an embodiment, a method according to various embodiments disclosed in the specification may be included and provided in a computer program product. The computer program product is a commercial product that may be traded between a seller and a buyer.

The computer program product may be distributed in a form of machine-readable storage medium (e.g., a CD-ROM), or distributed (e.g., downloaded or uploaded) through an application store (e.g., Play Store™) or directly or online between two user devices (e.g., smartphones). In the case of online distribution, at least a part of the computer program product (e.g., a downloadable application) may be at least temporarily generated or temporarily stored in a machine-readable storage medium, such as a server of a manufacturer, a server of an application store, or a memory of a relay server.

Although the aforementioned embodiments of the disclosure have been described with reference to the accompanying drawings, it will be understood by one of ordinary skill in the art that the disclosure may be embodied in other specific forms without departing from the scope and essential features of the disclosure. Accordingly, the embodiments described above should be understood as examples in all aspects and are not limited.

The invention claimed is:

1. A method, performed by an electronic device, of performing secure ranging with a target device, the method comprising:
   receiving a connection message for communication using a first communication method with the target device through a first communicator;
   transmitting, by a first applet in a secure element (SE) of the electronic device, a ranging session key for the target device to a second applet in the SE, the ranging session key being stored in the first applet;
   receiving a ranging session request from the target device;
   based on the ranging session request, obtaining, by a second communicator, the ranging session key for the target device from the second applet; and
   by using the ranging session key, performing secure ranging using a second communication method with the target device through the second communicator,
   wherein the first communication method is a Bluetooth low energy (BLE) communication method, and the second communication method is an ultra-wide band (UWB) communication method, and
   wherein the connection message comprises information in which identification information about the target device is encrypted.

2. The method of claim 1, further comprising:
   identifying the target device from the connection message,
   wherein identifying the target device from the connection message comprises:
      decrypting the connection message by using an encryption key pre-agreed with the target device; and
      based on the decrypted connection message, identifying the target device.

3. The method of claim 1, further comprising:
   identifying the target device, based on the connection message;
   determining whether a valid ranging session key for the identified target device is available; and
   based on the determining that the valid ranging session key is available, transmitting, to the first applet, a ranging session key setting message indicating transmission of the ranging session key to the second applet,
   wherein the ranging session key setting message comprises at least one of a session identifier or a digital key identifier for the target device, and
   wherein the first applet is configured to set, to the second applet, the ranging session key indexed based on the ranging session key setting message.

4. The method of claim 1, wherein transmitting the ranging session key to the second applet by the first applet further comprises:
   transmitting, by the first applet, the ranging session key to the second applet, based on the ranging session key setting message; and
   based on a result of the setting of the ranging session key to the second applet by the first applet, transmitting, by the first applet, a ranging session key setting response message to a framework,
   wherein the ranging session key setting response message comprises at least one of information about whether the ranging session key is successfully set, or a list of session identifiers stored in the second applet.

5. The method of claim 4, wherein-the-obtaining of the ranging session key for the target device from the second applet by the second communicator based on the ranging session request comprises:
   based on the ranging session key setting response message, determining whether the ranging session key corresponding to the ranging session request is stored in the second applet; and
   based on the determining that the ranging session key is stored in the second applet, triggering the second communicator to obtain the ranging session key from the second applet.

6. The method of claim 1, further comprising:
   in case that the second communicator has successfully obtained the ranging session key from the second applet, transmitting, to the first applet, a ranging session key deletion message requesting deletion of the ranging session key stored in the first applet; and
   deleting, by the first applet, the ranging session key indexed by the ranging session key deletion message,
   wherein the ranging session key deletion message comprises at least one of a session identifier or a digital key identifier for the target device.

7. The method of claim 6, further comprising:
   based on the ranging session key deletion message, deleting, by the first applet, the ranging session key; and
   based on a result of the deleting of the ranging session key, transmitting, by the first applet, a ranging session key deletion response message to a framework,
   wherein the ranging session key deletion response message comprises information about whether the ranging session key is successfully deleted.

8. An electronic device comprising:
   a secure element (SE) in which a first applet and a second applet are stored;
   a communicator comprising a first communicator and a second communicator; and
   a processor connected to the SE and configured to execute program instructions stored in the memory, wherein the processor is configured to:
control the first communicator to receive a connection message for communication using a first communication method with a target device,
transmit, by the first applet in the SE of the electronic device, a ranging session key for the target device to the second applet in the SE, the ranging session key being stored in the first applet,
receive a ranging session request from the target device,
based on the ranging session request, obtain, by the second communicator, the ranging session key for the target device from the second applet, and
control the second communicator to perform, by using the ranging session key, secure ranging using a second communication method with the target device,
wherein the first communication method is a Bluetooth low energy (BLE) communication method, and the second communication method is an ultra-wide band (UWB) communication method, and
wherein the connection message comprises information in which identification information about the target device is encrypted.

9. The electronic device of claim 8, wherein the processor is further configured to:
decrypt the connection message by using an encryption key pre-agreed with the target device, and
based on the decrypted connection message, identify the target device.

10. The electronic device of claim 8, wherein the processor is further configured to:
identify the target device based on the connection message,
determine whether a valid ranging session key for the identified target device is available, and
based on the determining that the valid ranging session key is available, transmit, to the first applet, a ranging session key setting message indicating transmission of the ranging session key to the second applet,
wherein the ranging session key setting message comprises at least one of a session identifier or a digital key identifier for the target device, and
wherein the first applet is configured to set, to the second applet, the ranging session key indexed based on the ranging session key setting message.

11. The electronic device of claim 8, wherein the processor is further configured to:
control the first applet to transmit the ranging session key to the second applet, based on the ranging session key setting message,
based on a result of the setting of the ranging session key to the second applet by the first applet, control the first applet to transmit a ranging session key setting response message to the processor, and
the ranging session key setting response message comprises at least one of information about whether the ranging session key is successfully set, or a list of session identifiers stored in the second applet.

12. The electronic device of claim 11, wherein the processor is further configured to:
based on the ranging session key setting response message, determine whether the ranging session key corresponding to the ranging session request is stored in the second applet, and
based on the determining that the ranging session key is stored in the second applet, trigger the second communicator to obtain the ranging session key from the second applet.

13. The electronic device of claim 8, wherein, in case that the second communicator has successfully obtained the ranging session key from the second applet, a ranging session key deletion message is transmitted to the first applet, the ranging session key deletion message requesting deletion of the ranging session key stored in the first applet.

* * * * *